United States Patent
Tatsumi

(10) Patent No.: US 7,672,021 B2
(45) Date of Patent: Mar. 2, 2010

(54) IMAGE FORMING APPARATUS AND METHOD

(75) Inventor: Setsuji Tatsumi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 1367 days.

(21) Appl. No.: 11/016,784

(22) Filed: Dec. 21, 2004

(65) Prior Publication Data
US 2005/0134931 A1    Jun. 23, 2005

(30) Foreign Application Priority Data
Dec. 22, 2003   (JP) .............................. 2003-425587

(51) Int. Cl.
*H04N 1/04*   (2006.01)
(52) U.S. Cl. .................. 358/401; 358/501; 358/1.1; 358/1.13
(58) Field of Classification Search .............. 358/401, 358/501, 1.1, 1.13
See application file for complete search history.

(56) References Cited
FOREIGN PATENT DOCUMENTS

| | | |
|---|---|---|
| JP | 11-105355 A | 4/1999 |
| JP | 2001-162898 A | 6/2001 |
| JP | 2001-347653 A | 12/2001 |
| WO | WO-01/01669 A1 | 1/2001 |

*Primary Examiner*—Houshang Safaipour
(74) *Attorney, Agent, or Firm*—Birch, Stewart, Kolasch & Birch, LLP

(57) ABSTRACT

The image forming apparatus comprises: an image forming section which includes an image forming device forming an image onto a recording medium; a plurality of recording medium supply sections which store recording media and supply the recording media to the image forming section; a conveyance device which conveys the recording media supplied from the plurality of recording medium supply sections; and an end timing control device which controls a timing at which the recording media of each of the plurality of recording medium supply sections come to an end, by controlling selection of supply source of the recording medium used for image formation by the image forming device, from among the plurality of recording medium supply sections.

11 Claims, 14 Drawing Sheets 50 (12K, 12C, 12M, 12Y)

51 52 54
‾‾‾
53

51 52 54
‾‾‾
53

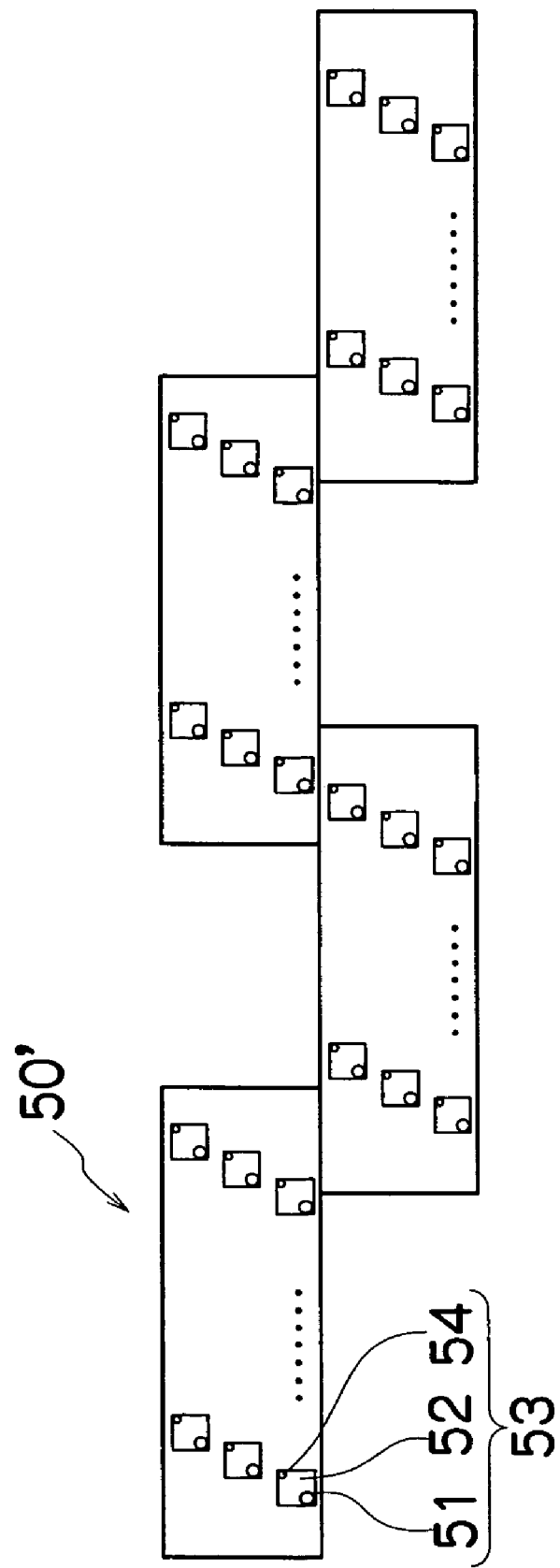

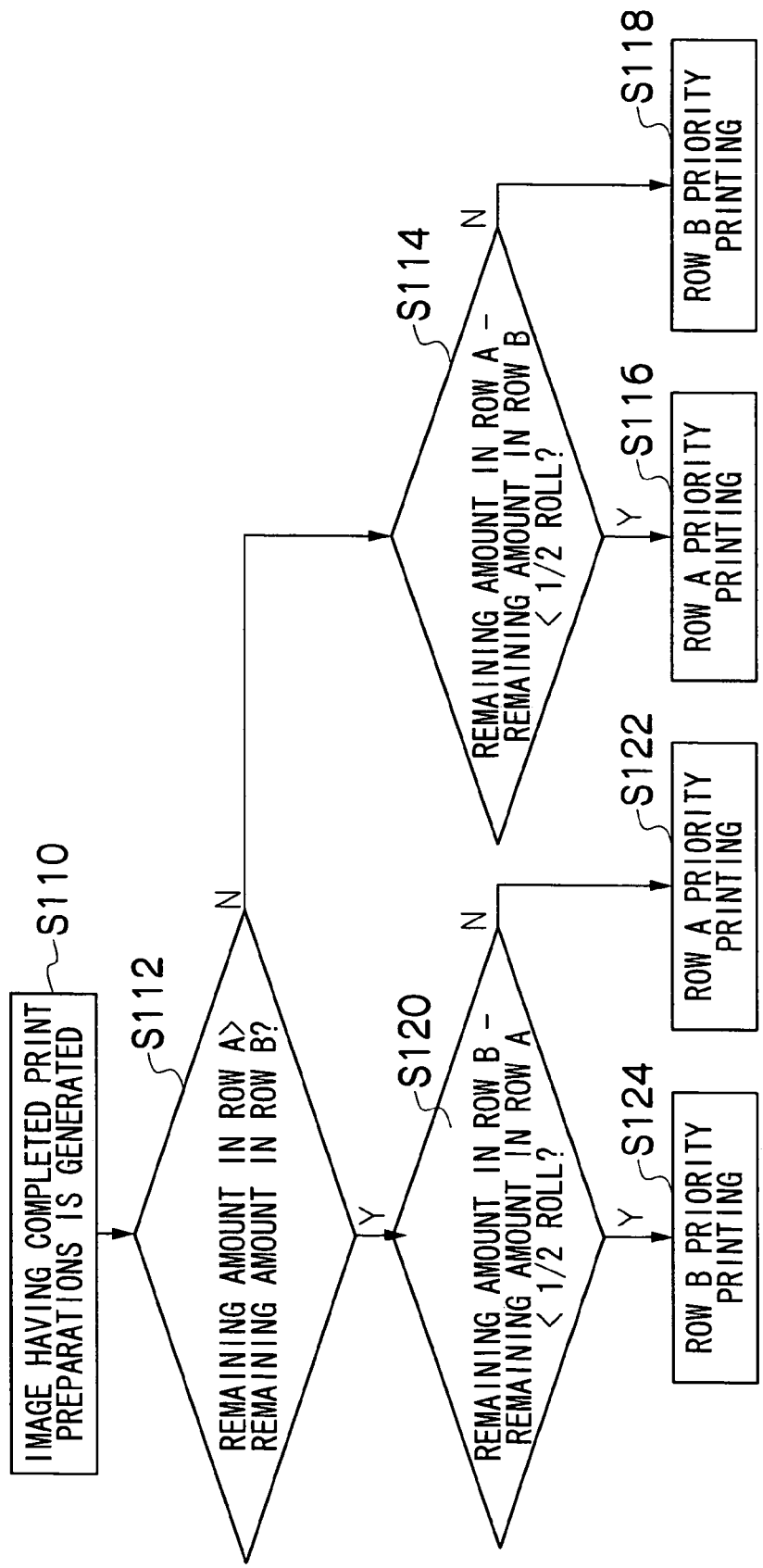

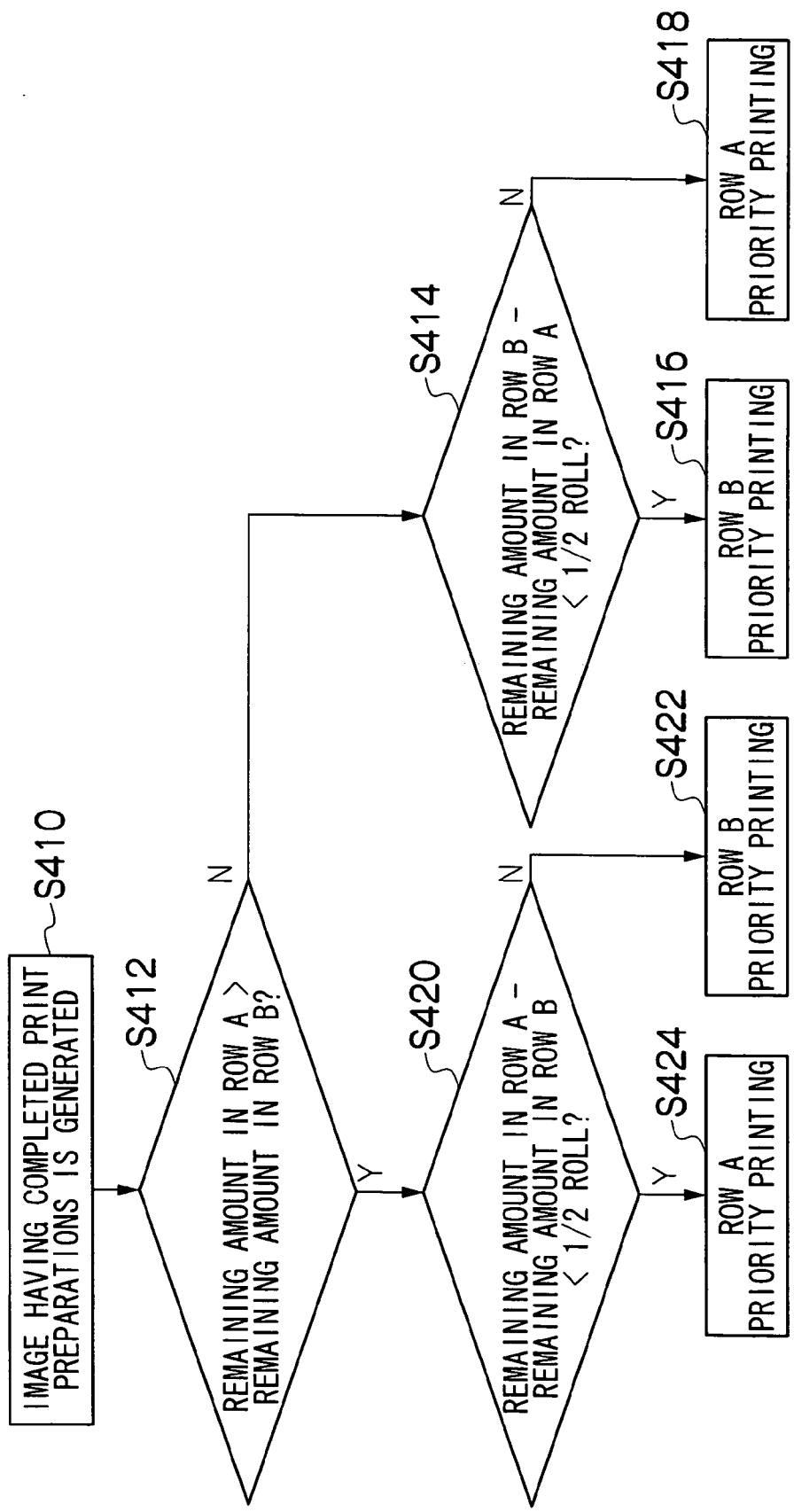

IMAGE FORMING APPARATUS AND METHOD

BACKGROUND OF THE INVENTION

1. Field of the Invention

The present invention relates to an image forming apparatus and method, and more specifically to a technology for contributing to the achievement of efficient replenishment and replacement of recording media suitable for a print system which is required to produce a large volume of prints at high speed, such as a photographic print service.

2. Description of the Related Art

For example, in a minilab system providing a photographic print service, there is a requirement to print narrow, large (L) size prints (127 mm×89 mm) at high speed. In order to satisfy the required print speed, it has been proposed that two rows of narrow-width paper be conveyed and printing be performed onto the respective paper rows simultaneously. Japanese Patent Application Publication No. 2001-347653 discloses a system for printing onto two rows of roll paper by means of one shuttle type inkjet head.

In a printer for business use such as a minilab system, it is important that prints are produced at high speed, but it is also important that there is no interruption to print production. One element which may cause an interruption of print production is the replacement of a paper roll (replenishment of paper) when the paper comes to an end. More specifically, in a system having a plurality of paper supply units in order to print a plurality of rows simultaneously, the operations of replacing paper rolls and replenishing paper are required at irregular intervals at the paper supply units, and this places a large burden on the worker (operator) and hence affects the overall working efficiency.

SUMMARY OF THE INVENTION

The present invention has been contrived in view of such circumstances, and an object thereof is to provide an image forming apparatus and method where replenishment and replacement of recording media can be carried out in a planned fashion, thereby making it possible to reduce the work burden and increase production efficiency, by controlling the timings at which the recording media end in a plurality of recording media supply units.

In order to attain the aforementioned object, the present invention is directed to an image forming apparatus, comprising: an image forming section which includes an image forming device forming an image onto a recording medium; a plurality of recording medium supply sections which store recording media and supply the recording media to the image forming section; a conveyance device which conveys the recording media supplied from the plurality of recording medium supply sections; and an end timing control device which controls a timing at which the recording media of each of the plurality of recording medium supply sections come to an end, by controlling selection of supply source of the recording medium used for image formation by the image forming device, from among the plurality of recording medium supply sections.

According to the present invention, in an image forming apparatus comprising a plurality of recording medium supply sections, control is implemented for switching the supply source of the recording medium used in image formation suitably, thereby adjusting the timings at which the recording media in each of the plurality of recording medium supply sections come to an end. Accordingly, it is possible to generate work timings for replenishment and replacement of the recording media in a planned fashion.

"Recording medium" indicates a medium on which an image is recorded by means of the action of the image forming device (this medium may also be called a print medium, image forming medium, image receiving medium, or the like). This term includes various types of media, irrespective of material and size, such as continuous paper, cut paper, sealed paper, resin sheets, such as OHP sheets, film, cloth, a printed circuit board on which a wiring pattern, or the like, is formed by means of an inkjet recording apparatus, and the like.

For example, if roll paper is used as the recording medium, then a roll replacement task is carried out when the paper comes to an end. Furthermore, if cut paper is used, then a task for replacing a cassette or replenishing paper in a paper tray is carried out when the paper comes to an end.

Preferably, the end timing control device controls supply of the recording media in such a manner that at least two recording medium supply sections of the plurality of recording medium supply sections come to an end at substantially same time. According to this, the recording medium replenishment or replacement tasks can be carried out together for a plurality of recording medium supply sections, and therefore improved efficiency can be achieved by concentration of the tasks. In particular, if control is implemented in such a manner that the media come to an end at substantially the same time in all of the plurality of recording medium supply sections, then it is possible to carry out the recording medium replenishment or replacement tasks together.

Preferably, the end timing control device controls supply of the recording media in such a manner that when one of the recording medium supply sections has come to an end, at least a prescribed quantity of the recording media remains in at least one of the other recording medium supply sections.

As one example of the end timing control, it is possible to supply recording media from at least one recording medium supply section by preventing the paper from coming to an end simultaneously in a plurality of recording medium supply sections. Thus, print production can be continued without halting the device completely.

In this case, for example, in a desirable mode, the "prescribed amount" is set to an amount that corresponds to the amount of continuous printing carried out in the time period required for the recording medium replenishment or replacement task. According to this mode, it is possible to continue the supply of recording medium from another recording medium supply section up until the completion of a recording medium replenishment or replacement task in a recording medium supply section where the medium has come to an end. Therefore, printing is not interrupted.

For example, the image forming apparatus comprises: two recording medium supply sections capable of supplying the recording media of same type, wherein the end timing control device controls the supply of the recording media in such a manner that when the one of the recording medium supply sections has come to the end, a remaining amount in the other recording medium supply section is approximately ½ of the maximum storable amount.

According to the present invention, the two recording medium supply sections come to ends alternately, and when one has ended, the other has approximately ½ of the maximum storable amount (corresponding to a new roll, a new cassette, a fully loaded supply tray, or the like) remaining. Thus, the tasks of replenishing and replacing recording media can be spaced out, and the time intervals between these tasks can be standardized.

Preferably, the end timing control device controls supply of the recording media in such a manner that at least two recording medium supply sections of the plurality of recording medium supply sections come to an end at substantially same time.

Preferably, the image forming apparatus further comprises: a mode setting device which switches between: a first control mode in which the end timing control device controls the supply of the recording media in such a manner that when the one of the plurality of recording medium supply sections has come to the end, the at least the prescribed quantity of the recording medium remains in the at least one of the other recording medium supply sections; and a second control mode in which the end timing control device controls the supply of the recording media in such a manner that at least two of the plurality of recording medium supply sections come to the end at substantially same time, wherein the end timing control device implements control according to one of the first control mode and the second control mode depending on a setting of the mode setting device.

By providing a mode setting device whereby the user (operator) can set the end timings of the plurality of recording medium supply sections, it is possible to generate recording medium replenishment or replacement tasks in accordance with the printing work status of the user.

Preferably, the conveyance device comprises a multiple-row conveyance device which conveys the recording media supplied from the plurality of recording medium supply sections, in a plurality of rows arranged in a direction orthogonal to a direction of conveyance of the recording media; and the image forming device comprises a recording head which forms images simultaneously on the plurality of recording media arranged in the plurality of rows.

The present invention is suitable for application to an image forming apparatus capable of forming images simultaneously onto a plurality of recording media by means of multiple-row conveyance.

Preferably, the timing control device controls formation of the images on the recording media in such a manner that a wait time for image formation in each of the plurality of rows is less than a prescribed time.

By taking account of the wait time in each row, in such a manner that the wait time in each of the supply rows does not become excessively large, then it is possible to suppress decline in printing speed.

If the "image recording element" is an inkjet recording head provided with nozzles that discharge ink, then provided that the wait time for each supply row is controlled in such a manner that it does not exceed a prescribed time period, then it is possible to prevent increase in the viscosity of the ink or infiltration of air bubbles, and hence the number of preliminary discharge (purge) operations or suction operations required for restoring the discharge performance can be reduced.

For example, the recording head is a line type head in which a plurality of image recording elements are arranged throughout a length corresponding to a full image forming width of the plurality of recording media arranged in the plurality of rows.

A "full line type recording head" is usually disposed following a direction that is orthogonal to the relative direction of conveyance of the recording medium, but modes may also be adopted wherein the recording head is disposed following an oblique direction that forms a prescribed angle with respect to the direction orthogonal to the conveyance direction. Furthermore, the arrangement of the image recording elements in the recording head is not limited to a single line arrangement, and a matrix arrangement (two-dimensional arrangement) comprising a plurality of rows may also be adopted. Moreover, a mode may also be adopted wherein a row of image recording elements corresponding to the full recordable width is constituted by combining a plurality of short recording head units each having image recording element rows which do not reach a length corresponding to the full recordable width.

Preferably, the image forming apparatus further comprises: a remaining amount ascertaining device which ascertains remaining amounts of the recording media stored respectively in the plurality of recording medium supply sections, wherein the end timing control device selects the supply source of the recording medium used for the image formation according to remaining amount information for the respective recording medium supply sections obtained by the remaining amount ascertaining device.

Desirably, when adjusting the end timings between a plurality of recording medium supply sections, the supply of recording media is controlled by ascertaining the remaining amounts in each of the recording medium supply sections.

The remaining amount ascertaining device may be a device that measures the remaining amount of recording medium directly, or it may be a device that predicts (estimates) the remaining amount from the amount used.

The present invention also provides a method for achieving the aforementioned objects. More specifically, the present invention is also directed to an image forming method for forming images on recording media, in which a plurality of recording medium supply sections are provided and the recording media stored in the respective recording medium supply sections are supplied to an image forming section, comprising the steps of: ascertaining remaining amounts of the recording medium stored respectively in the plurality of recording medium supply sections; selecting supply source of the recording medium used in image formation, in such a manner that timings at which the recording media in the plurality of recording medium supply sections come to an end are adjusted according to remaining amount information for the respective recording medium supply sections; conveying the recording medium supplied from the recording medium supply section in accordance with the selecting step; and forming an image on the conveyed recording medium.

According to the present invention, in an image forming apparatus provided with a plurality of recording medium supply sections, it is possible to carry out tasks for replenishing and replacing recording media in a planned manner, by suitably controlling the timings at which the recording media in each of the plurality of recording medium supply section come to an end. Thereby, it is possible to reduce the work burden and to improve efficiency in print production.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 3C is a perspective plan view showing another example of the configuration of the print head;

FIG. 8B is a flowchart showing an operating sequence in the inkjet recording apparatus;

FIG. 13 is a flowchart showing an operating sequence in the inkjet recording apparatus.

DETAILED DESCRIPTION OF THE PREFERRED EMBODIMENTS

General configuration of an inkjet recording apparatus

Figure 1:
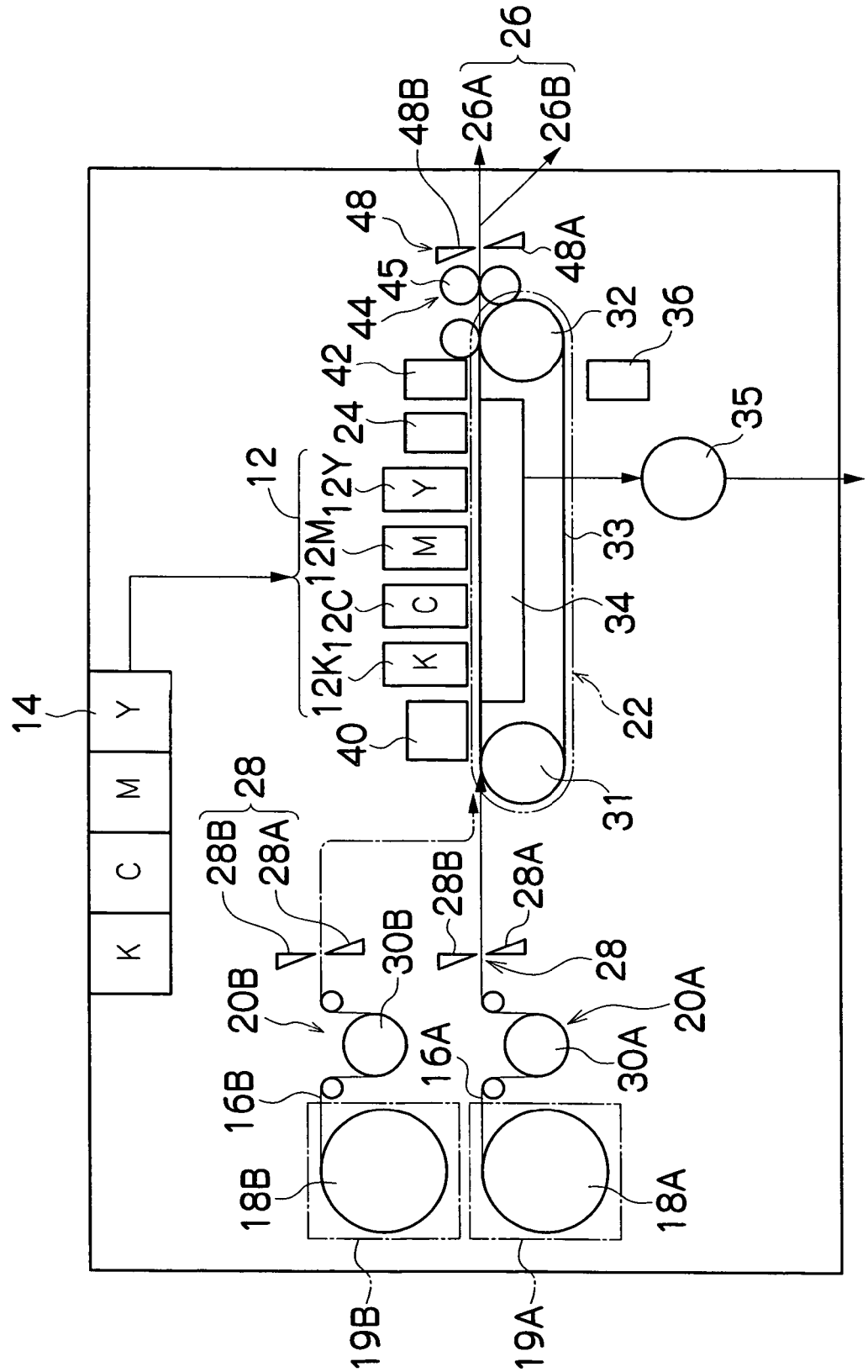
FIG. 1 is a general schematic drawing of an inkjet recording apparatus according to an embodiment of the present invention.

FIG. 1 is a general schematic drawing of an inkjet recording apparatus according to an embodiment of the present invention. As shown in FIG. 1, the inkjet recording apparatus 10 comprises: a printing unit 12 (corresponding to the image forming device) having a plurality of print heads 12K, 12C, 12M, and 12Y for ink colors of black (K), cyan (C), magenta (M), and yellow (Y), respectively; an ink storing and loading unit 14 for storing inks of K, C, M and Y to be supplied to the print heads 12K, 12C, 12M, and 12Y; paper supply units 18A and 18B for supplying recording papers 16A and 16B to the printing unit 12; decurling units 20A and 20B for removing curl in the recording papers 16A and 16B supplied from the paper supply units 18A and 18B; a suction belt conveyance unit 22 disposed facing the nozzle face (ink-droplet ejection face) of the print unit 12, for conveying the recording papers 16A and 16B while keeping the recording papers 16A and 16B flat; a print determination unit 24 for reading the printed result produced by the printing unit 12; and a paper output unit 26 for outputting image-printed recording paper (printed matter) to the exterior.

In FIG. 1, the papers of the same kind are supplied from the two paper supply units 18A and 18B, and magazines 19A and 19B for rolled papers (continuous papers) are shown as examples of the paper supply units 18A and 18B; however, more magazines with paper differences such as paper width and quality may be jointly provided. Moreover, papers may be supplied with cassettes that contain cut papers loaded in layers and that are used jointly or in lieu of magazines for rolled papers.

In the case of a configuration in which a plurality of types of recording paper can be used, it is preferable that an information recording medium such as a bar code and a wireless tag containing information about the type of paper is attached to the magazine, and by reading the information contained in the information recording medium with a predetermined reading device, the type of paper to be used is automatically determined, and ink-droplet ejection is controlled so that the ink-droplets are ejected in an appropriate manner in accordance with the type of paper.

The recording papers 16A and 16B delivered from the paper supply units 18A and 18B retain curl due to having been loaded in the magazines 19A and 19B. In order to remove the curl, heat is applied to the recording papers 16A and 16B in the decurling units 20A and 20B by heating drums 30A and 30B in the direction opposite from the curl direction in the magazines 19A and 19B. The heating temperature at this time is preferably controlled so that the recording papers 16A and 16B have a curl in which the surface on which the print is to be made is slightly round outward.

In the case of the configuration in which roll paper is used, cutters (first cutters) 28 are provided as shown in FIG. 1, and the continuous papers are cut into a desired size by the cutters 28. Each of the cutters 28 has a stationary blade 28A, whose length is not less than the width of the conveyor pathway of the recording papers 16A and 16B, and a round blade 28B, which moves along the stationary blade 28A. The stationary blade 28A is disposed on the reverse side of the printed surface of the recording papers 16A and 16B, and the round blade 28B is disposed on the printed surface side across the conveyor pathway. When cut papers are used, the cutters 28 are not required.

Figure 2:
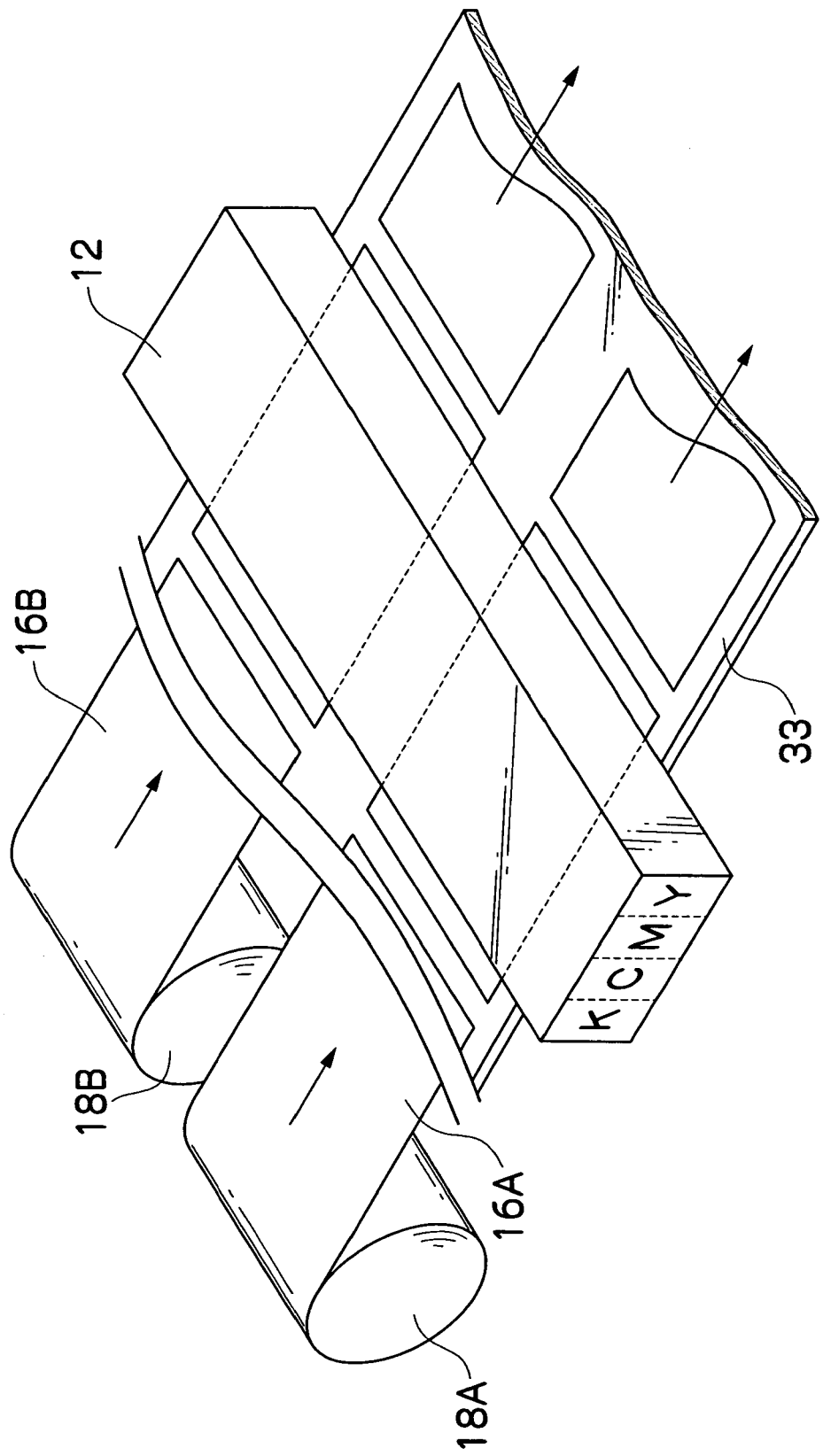
FIG. 2 is a plan view of principal components of an area around a printing unit of the inkjet recording apparatus in FIG. 1.

The decurled and cut recording papers 16A and 16B are delivered to the suction belt conveyance unit 22. Although the paper supply units 18A and 18B are shown in FIG. 1 for convenience as if they were disposed vertically with respect to each other, the recording papers 16A and 16B supplied from the supply units 18A and 18B are conveyed side by side in the conveyor pathway as shown in FIG. 2 in reality.

The suction belt conveyance unit 22 has a configuration in which an endless belt 33 is set around rollers 31 and 32 so that the portion of the endless belt 33 facing at least the nozzle face of the printing unit 12 and the sensor face of the print determination unit 24 forms a horizontal plane (flat plane).

The belt 33 has a width that is greater than the total width of the recording papers 16A and 16B arranged in two rows (i.e., double the width of the recording paper 16A), and a plurality of suction apertures (not shown) are formed on the belt surface. A suction chamber 34 is disposed in a position facing the sensor surface of the print determination unit 24 and the nozzle surface of the printing unit 12 on the interior side of the belt 33, which is set around the rollers 31 and 32, as shown in FIG. 1; and the suction chamber 34 provides suction by a fan 35 to generate a negative pressure, and the recording papers 16A and 16B are held on the belt 33 by suction.

The belt 33 is driven in the clockwise direction in FIG. 1 by the motive force of a motor (not shown in FIG. 1, but shown as a motor 88 in FIG. 7) being transmitted to at least one of the rollers 31 and 32, which the belt 33 is set around, and the recording papers 16A and 16B held on the belt 33 are conveyed from left to right in FIG. 1.

Since ink adheres to the belt 33 when a marginless print job or the like is performed, a belt-cleaning unit 36 is disposed in a predetermined position (a suitable position outside the printing area) on the exterior side of the belt 33. Although the details of the configuration of the belt-cleaning unit 36 are not shown, examples thereof include a configuration in which the belt 33 is nipped with a cleaning roller such as a brush roller and a water absorbent roller, an air blow configuration in which clean air is blown onto the belt 33, or a combination of these. In the case of the configuration in which the belt 33 is nipped with the cleaning roller, it is preferable to make the line velocity of the cleaning roller different than that of the belt 33 to improve the cleaning effect.

The inkjet recording apparatus 10 can comprise a roller nip conveyance mechanism, in which the recording paper 16 is pinched and conveyed with nip rollers, instead of the suction belt conveyance unit 22. However, there is a drawback in the roller nip conveyance mechanism that the print tends to be smeared when the printing area is conveyed by the roller nip action because the nip roller makes contact with the printed surface of the paper immediately after printing. Therefore, the suction belt conveyance in which nothing comes into contact with the image surface in the printing area is preferable.

A heating fan 40 is disposed on the upstream side of the printing unit 12 in the conveyance pathway formed by the suction belt conveyance unit 22. The heating fan 40 blows heated air onto the recording papers 16A and 16B to heat the recording papers 16A and 16B immediately before printing so that the ink deposited on the recording papers 16A and 16B dries more easily.

As shown in FIG. 2, the printing unit 12 forms a so-called full-line head in which a line head having a length that corresponds to the total width of the recording papers 16A and 16B arranged in two rows is disposed in the main scanning direction perpendicular to the delivering direction of the recording papers 16A and 16B (hereinafter referred to as the paper conveyance direction) represented by the arrows in FIG. 2, which is substantially perpendicular to a width direction of the recording papers 16A and 16B. Each of the print heads 12K, 12C, 12M, and 12Y is composed of a line head, in which a plurality of ink-droplet ejection apertures (nozzles) are arranged along a length that exceeds at least one side of the maximum-size recording paper intended for use in the inkjet recording apparatus 10. A specific structural example is described later.

The print heads 12K, 12C, 12M, and 12Y are arranged in this order from the upstream side along the paper conveyance direction. A color print can be formed on the recording papers 16A and 16B by ejecting the inks from the print heads 12K, 12C, 12M, and 12Y, respectively, onto the recording papers 16A and 16B while conveying the recording papers 16A and 16B.

The print unit 12, in which the full-line heads covering the entire width of the paper are thus provided for the respective ink colors, can record an image over the entire surface of the recording papers 16A and 16B by performing the action of moving the recording papers 16A and 16B and the print unit 12 relatively to each other in the sub-scanning direction just once (i.e., with a single sub-scan). Higher-speed printing is thereby made possible and productivity can be improved in comparison with a shuttle type head configuration in which a print head reciprocates in the main scanning direction.

Although the configuration with the KCMY four standard colors is described in the present embodiment, combinations of the ink colors and the number of colors are not limited to those. Light and/or dark inks, and special color inks can be added as required. For example, a configuration is possible in which print heads for ejecting light-colored inks such as light cyan and light magenta are added. The order of the arranged ink color heads is not limited to those.

As shown in FIG. 1, the ink storing and loading unit 14 has tanks for storing the inks of K, C, M and Y to be supplied to the print heads 12K, 12C, 12M, and 12Y, and the tanks are connected to the print heads 12K, 12C, 12M, and 12Y through channels (not shown), respectively. The ink storing and loading unit 14 has a warning device (e.g., a display device, an alarm sound generator) for warning when the remaining amount of any ink is low, and has a mechanism for preventing loading errors among the colors.

The print determination unit 24 has an image sensor for capturing an image of the ink-droplet deposition result of the print unit 12, and functions as a device to check for ejection defects such as clogs of the nozzles in the print unit 12 from the ink-droplet deposition results evaluated by the image sensor.

The print determination unit 24 of the present embodiment is configured with at least a line sensor having rows of photoelectric transducing elements with a width that is greater than the ink-droplet ejection width (image recording width) of the print heads 12K, 12C, 12M, and 12Y. This line sensor has a color separation line CCD sensor including a red (R) sensor row composed of photoelectric transducing elements (pixels) arranged in a line provided with an R filter, a green (G) sensor row with a G filter, and a blue (B) sensor row with a B filter. Instead of a line sensor, it is possible to use an area sensor composed of photoelectric transducing elements which are arranged two-dimensionally.

The print determination unit 24 reads a test pattern or the target image printed with the print heads 12K, 12C, 12M, and 12Y for the respective colors, and the ejection of each head is determined. The ejection determination includes the presence of the ejection, measurement of the dot size, and measurement of the dot deposition position.

A post-drying unit 42 is disposed following the print determination unit 24. The post-drying unit 42 is a device to dry the printed image surface, and includes a heating fan, for example. It is preferable to avoid contact with the printed surface until the printed ink dries, and a device that blows heated air onto the printed surface is preferable.

In cases in which printing is performed with dye-based ink on porous paper, blocking the pores of the paper by the application of pressure prevents the ink from coming contact with ozone and other substance that cause dye molecules to break down, and has the effect of increasing the durability of the print.

A heating/pressurizing unit 44 is disposed following the post-drying unit 42. The heating/pressurizing unit 44 is a device to control the glossiness of the image surface, and the image surface is pressed with a pressure roller 45 having a predetermined uneven surface shape while the image surface is heated, and the uneven shape is transferred to the image surface.

The printed matter generated in this manner is outputted from the paper output unit 26. The target print (i.e., the result of printing the target image) and the test print are preferably outputted separately. In the inkjet recording apparatus 10, a sorting device (not shown) is provided for switching the outputting pathway in order to sort the printed matter with the target print and the printed matter with the test print, and to send them to paper output units 26A and 26B, respectively. When the target print and the test print are simultaneously formed in parallel on the same large sheet of paper, the test print portion is cut and separated by a cutter (second cutter) 48. The cutter 48 is disposed directly in front of the paper output unit 26, and is used for cutting the test print portion from the target print portion when a test print has been performed in the blank portion of the target print. The structure of the cutter 48 is the same as the first cutter 28 described above, and has a stationary blade 48A and a round blade 48B.

Although not shown in FIG. 1, the paper output unit 26A for the target prints is provided with a sorter for collecting prints according to print orders.

Structure of the Print Heads

Next, the structure of the print heads is described. The print heads 12K, 12C, 12M and 12Y have the same structure, and a reference numeral 50 is hereinafter designated to any of the print heads 12K, 12C, 12M and 12Y.

Figure 3A:
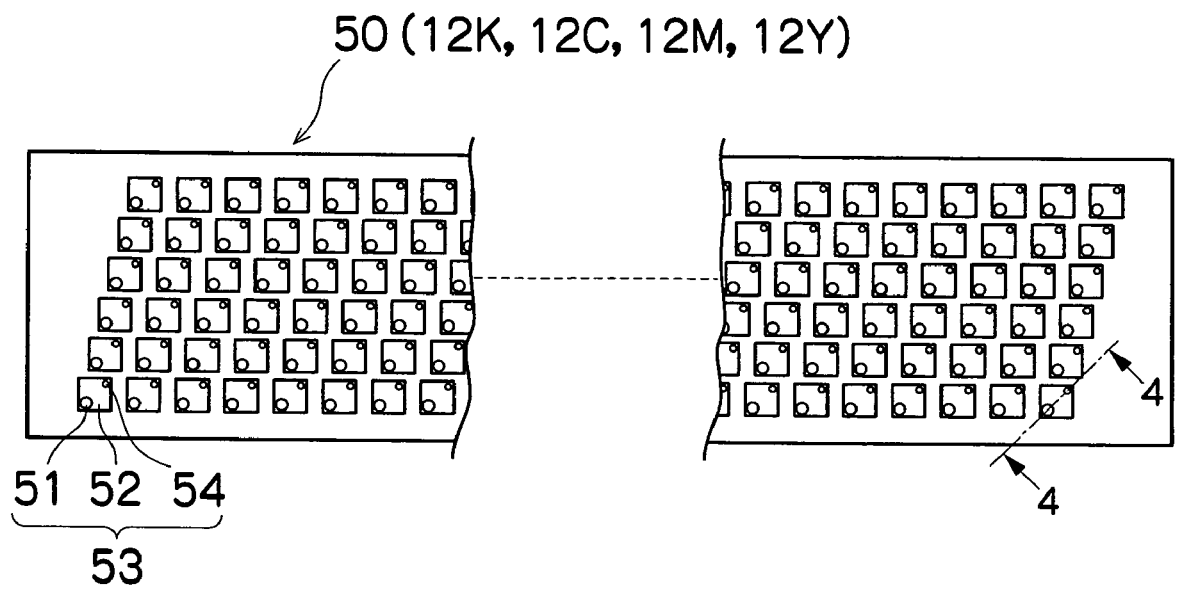
FIG. 3A is a perspective plan view showing an example of a configuration of a print head.
Figure 3B:
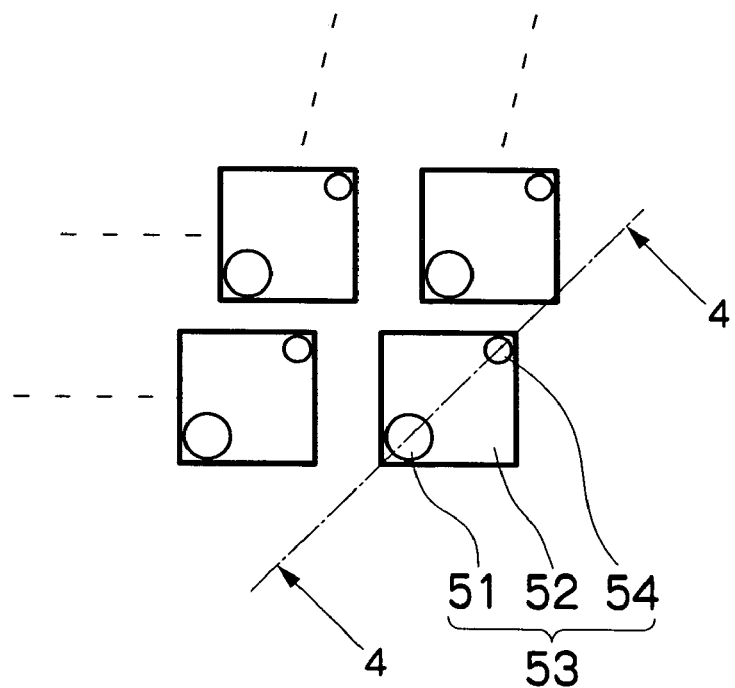
FIG. 3B is a partial enlarged view of FIG. 3A.
Figure 4:
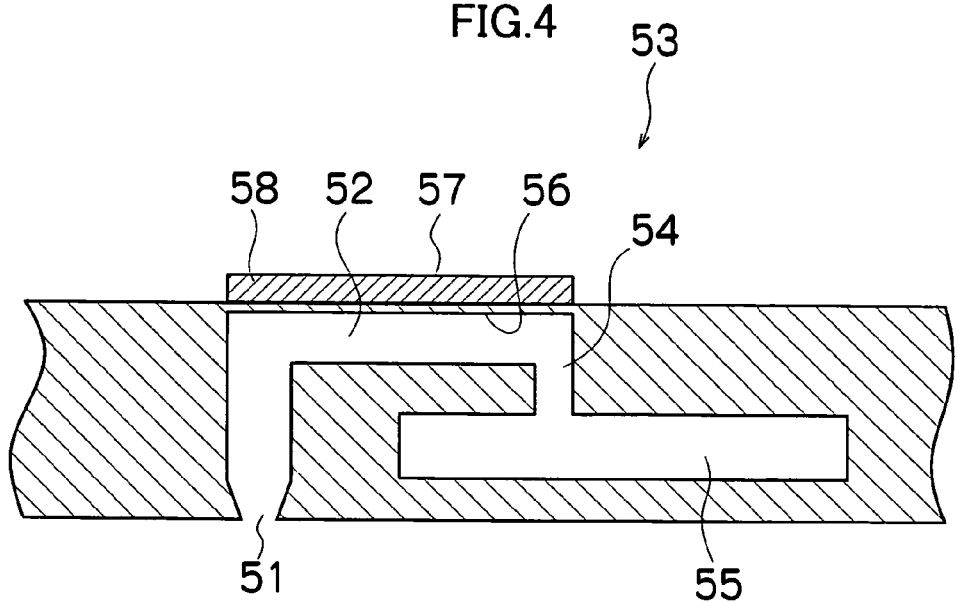
FIG. 4 is a cross-sectional view along a line 4-4 in FIGS. 3A and 3B.

FIG. 3A is a perspective plan view showing an example of the configuration of the print head 50, FIG. 3B is an enlarged view of a portion thereof, FIG. 3C is a perspective plan view showing another example of the configuration of the print head, and FIG. 4 is a cross-sectional view taken along the line 4-4 in FIGS. 3A and 3B, showing the inner structure of an ink chamber unit.

The nozzle pitch in the print head 50 should be minimized in order to maximize the density of the dots printed on the surface of the recording papers 16A and 16B. As shown in FIGS. 3A, 3B, 3C and 4, the print head 50 in the present embodiment has a structure in which a plurality of ink chamber units 53 including nozzles 51 for ejecting ink-droplets and pressure chambers 52 corresponding to the nozzles 51 are two-dimensionally disposed in the form of a staggered matrix, and the effective nozzle distance (the projection nozzle pitch) as projected in the head lengthwise direction (the direction perpendicular to the paper conveyance direction) is thereby made small.

Alternatively, as shown in FIG. 3C, a full-line head can be composed of a plurality of short two-dimensionally arrayed head units 50' arranged in the form of a staggered matrix and combined so as to form nozzle rows having a length that corresponds to the total width of the recording papers 16A and 16B arranged in two rows.

As shown in FIGS. 3A to 3C, the planar shape of the pressure chamber 52 provided for each nozzle 51 is substantially a square, and the nozzle 51 and an inlet of supplied ink (supply port) 54 are disposed in both corners on a diagonal line of the square. The shape of the pressure chamber 52 is not limited to the present embodiment, and the planar shape of this may be a polygon such as a quadrangle (a diamond, an oblong, or the like), a pentagon and a hexagon, a circle, or an ellipse.

As shown in FIG. 4, each pressure chamber 52 is connected to a common channel 55 through the supply port 54. The common channel 55 is connected to an ink tank 60 (not shown in FIG. 4, but shown in FIG. 6), which is a base tank that supplies ink, and the ink supplied from the ink tank 60 is delivered through the common flow channel 55 to the pressure chambers 52.

An actuator 58 provided with an individual electrode 57 is bonded to a pressure plate 56, which forms the part of the pressure chamber 52 (the upper face in FIG. 4). When a drive voltage is applied to the individual electrode 57, the actuator 58 is deformed, the volume of the pressure chamber 52 is thereby changed, and the pressure in the pressure chamber 52 is thereby changed, so that the ink inside the pressure chamber 52 is thus discharged through the nozzle 51. The actuator 58 is preferably a piezoelectric element. When ink is discharged, new ink is supplied to the pressure chamber 52 from the common flow channel 55 through the supply port 54.

Figure 5:
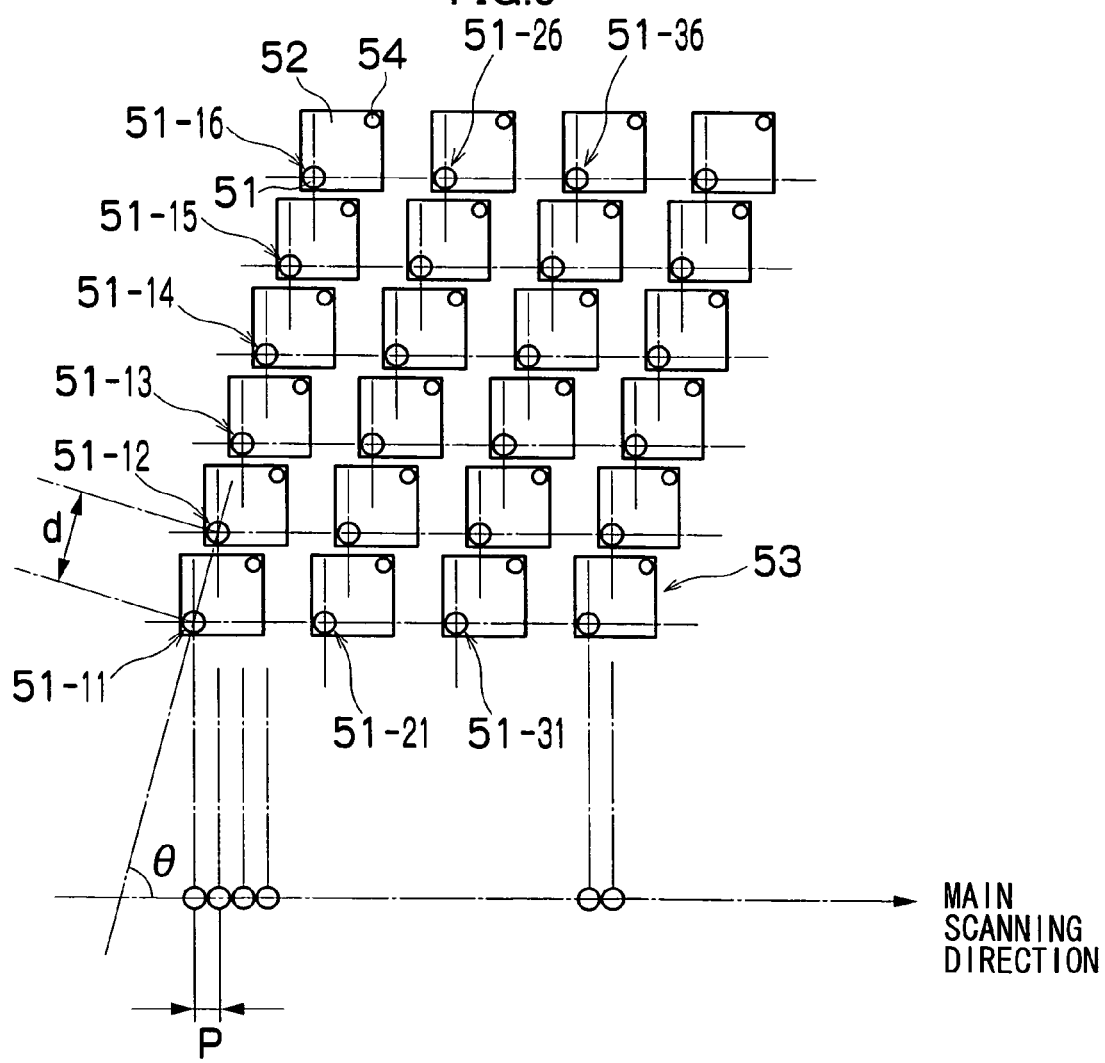
FIG. 5 is an enlarged view showing nozzle arrangement of the print head in FIG. 3A.

The plurality of ink chamber units 53 having such a structure are arranged in a grid with a fixed pattern in the line-printing direction along the main scanning direction and in the diagonal-row direction forming a fixed angle θ that is not a right angle with the main scanning direction, as shown in FIG. 5. With the structure in which the plurality of rows of ink chamber units 53 are arranged at a fixed pitch d in the direction at the angle θ with respect to the main scanning direction, the nozzle pitch P as projected in the main scanning direction is d×cos θ.

Hence, the nozzles 51 can be regarded to be equivalent to those arranged at a fixed pitch P on a straight line along the main scanning direction. Such configuration results in a nozzle structure in which the nozzle row projected in the main scanning direction has a high nozzle density of up to 2,400 nozzles per inch (npi).

In a full-line head comprising rows of nozzles that have a length corresponding to the entire width of the image recordable width, the "main scanning" is defined as to print one line (a line formed of a row of dots, or a line formed of a plurality of rows of dots) in the width direction of the recording paper (the direction perpendicular to the delivering direction of the recording paper) by driving the nozzles in one of the following ways: (1) simultaneously driving all the nozzles; (2) sequentially driving the nozzles from one side toward the other; and (3) dividing the nozzles into blocks and sequentially driving the blocks of the nozzles from one side toward the other.

In particular, when the nozzles 51 arranged in a matrix such as that shown in FIG. 5 are driven, the main scanning according to the above-described (3) is preferred. More specifically, the nozzles 51-11, 51-12, 51-13, 51-14, 51-15 and 51-16 are treated as a block (additionally; the nozzles 51-21, 51-22, . . . , 51-26 are treated as another block; the nozzles 51-31, 51-32, . . . , 51-36 are treated as another block, . . . ); and one line is printed in the width direction of the recording papers 16A and 16B by sequentially driving the nozzles 51-11, 51-12, . . . , 51-16 in accordance with the conveyance velocity of the recording papers 16A and 16B.

On the other hand, the "sub-scanning" is defined as to repeatedly perform printing of one line (a line formed of a row of dots, or a line formed of a plurality of rows of dots) formed by the main scanning, while moving the full-line head and the recording paper relatively to each other.

The "main scanning direction" is described as the direction of one line recorded by the above-described main scanning, the "sub-scanning direction" is described as the direction performing the above-described sub-scanning. More specifically, in the present embodiment, the delivering direction of the recording paper 16A and 16B is the sub-scanning direction, and the direction perpendicular to the sub-scanning direction is the main scanning direction.

In implementing the present invention, the arrangement of the nozzles is not limited to that of the example illustrated. Moreover, a method is employed in the present embodiment where an ink droplet is ejected by means of the deformation of the actuator 58, which is typically a piezoelectric element; however, in implementing the present invention, the method used for discharging ink is not limited in particular, and instead of the piezo jet method, it is also possible to apply various types of methods, such as a thermal jet method where the ink is heated and bubbles are caused to form therein by means of a heat generating body such as a heater, ink droplets being ejected by means of the pressure of these bubbles.

Figure 6:
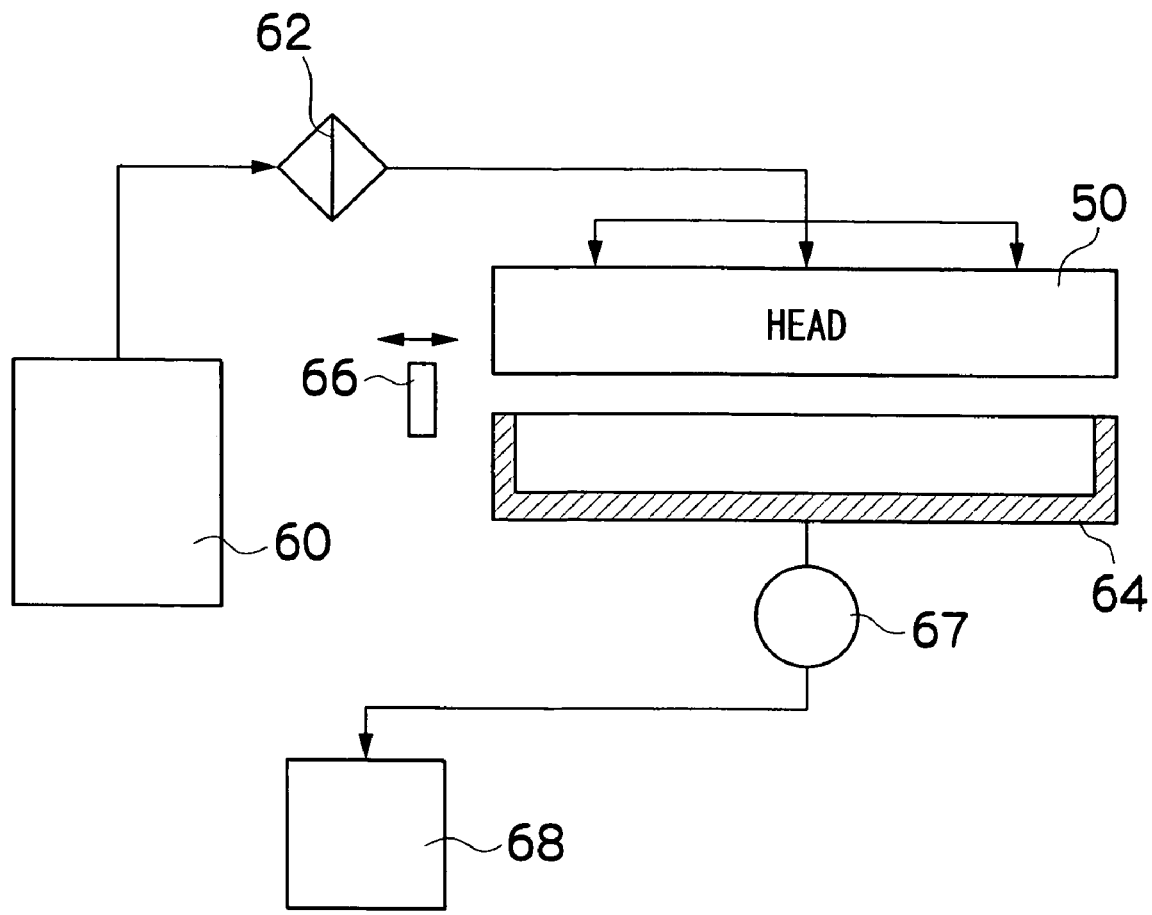
FIG. 6 is a schematic drawing showing a configuration of an ink supply system in the inkjet recording apparatus.

FIG. 6 is a schematic drawing showing the configuration of the ink supply system in the inkjet recording apparatus 10.

The ink tank 60 is a base tank that supplies ink and is set in the ink storing and loading unit 14 described with reference to FIG. 1. The aspects of the ink tank 60 include a refillable type and a cartridge type: when the remaining amount of ink is low, the ink tank 60 of the refillable type is filled with ink through a filling port (not shown) and the ink tank 60 of the cartridge type is replaced with a new one. In order to change the ink type in accordance with the intended application, the cartridge type is suitable, and it is preferable to represent the ink type information with a bar code or the like on the cartridge, and to perform ejection control in accordance with the ink type. The ink tank 60 in FIG. 6 is equivalent to the ink storing and loading unit 14 in FIG. 1 described above.

A filter 62 for removing foreign matters and bubbles is disposed between the ink tank 60 and the print head 50 as shown in FIG. 6. The filter mesh size in the filter 62 is preferably equivalent to or less than the diameter of the nozzle and commonly about 20 µm.

Although not shown in FIG. 6, it is preferable to provide a sub-tank integrally to the print head 50 or nearby the print head 50. The sub-tank has a damper function for preventing variation in the internal pressure of the head and a function for improving refilling of the print head.

The inkjet recording apparatus 10 is also provided with a cap 64 as a device to prevent the nozzles 51 from drying out or to prevent an increase in the ink viscosity in the vicinity of the nozzles 51, and a cleaning blade 66 as a device to clean the nozzle face 50A. A maintenance unit including the cap 64 and the cleaning blade 66 can be relatively moved with respect to the print head 50 by a movement mechanism (not shown), and is moved from a predetermined holding position to a maintenance position below the print head 50 as required.

The cap 64 is displaced up and down relatively with respect to the print head 50 by an elevator mechanism (not shown). When the power of the inkjet recording apparatus 10 is switched OFF or when in a print standby state, the cap 64 is raised to a predetermined elevated position so as to come into close contact with the print head 50, and the nozzle face 50A is thereby covered with the cap 64.

The cleaning blade 66 is composed of rubber or another elastic member, and can slide on the ink discharge surface (surface of the nozzle plate) of the print head 50 by means of a blade movement mechanism (not shown). When ink droplets or foreign matter has adhered to the nozzle plate, the surface of the nozzle plate is wiped, and the surface of the nozzle plate is cleaned by sliding the cleaning blade 66 on the nozzle plate.

During printing or standby, when the frequency of use of specific nozzles is reduced and ink viscosity increases in the vicinity of the nozzles, a preliminary discharge is made toward the cap 64 to discharge the degraded ink.

Also, when bubbles have become intermixed in the ink inside the print head 50 (inside the pressure chamber), the cap 64 is placed on the print head 50, ink (ink in which bubbles have become intermixed) inside the pressure chamber is removed by suction with a suction pump 67, and the suction-removed ink is sent to a collection tank 68. This suction action entails the suctioning of degraded ink whose viscosity has increased (hardened) when initially loaded into the head, or when service has started after a long period of being stopped.

When a state in which ink is not discharged from the print head 50 continues for a certain amount of time or longer, the ink solvent in the vicinity of the nozzles 51 evaporates and ink viscosity increases. In such a state, ink can no longer be discharged from the nozzle 51 even if the actuator 58 for the discharge driving is operated. Before reaching such a state the actuator 58 is operated (in a viscosity range that allows discharge by the operation of the actuator 59), and the preliminary discharge is made toward the ink receptor to which the ink whose viscosity has increased in the vicinity of the nozzle is to be discharged. After the nozzle surface is cleaned by a wiper such as the cleaning blade 66 provided as the cleaning device for the nozzle face, a preliminary discharge is also carried out in order to prevent the foreign matter from becoming mixed inside the nozzles 51 by the wiper sliding operation. The preliminary discharge is also referred to as "dummy discharge", "purge", "liquid discharge", and so on.

When bubbles have become intermixed in the nozzle 51 or the pressure chamber 52, or when the ink viscosity inside the nozzle 51 has increased over a certain level, ink can no longer be discharged by the preliminary discharge, and a suctioning action is carried out as follows.

More specifically, when bubbles have become intermixed in the ink inside the nozzle 51 and the pressure chamber 52, ink can no longer be discharged from the nozzles even if the actuator 58 is operated. Also, when the ink viscosity inside the nozzle 51 has increased over a certain level, ink can no longer be discharged from the nozzle 51 even if the actuator 58 is operated. In these cases, a suctioning device to remove the ink inside the pressure chamber 52 by suction with a suction pump, or the like, is placed on the nozzle face of the print head 50, and the ink in which bubbles have become intermixed or the ink whose viscosity has increased is removed by suction.

However, this suction action is performed with respect to all the ink in the pressure chamber 52, so that the amount of ink consumption is considerable. Therefore, a preferred aspect is one in which a preliminary discharge is performed when the increase in the viscosity of the ink is small.

The cap 64 described with reference to FIG. 6 serves as the suctioning device and also as the ink receptacle for the preliminary discharge.

Description of Control System

Figure 7:
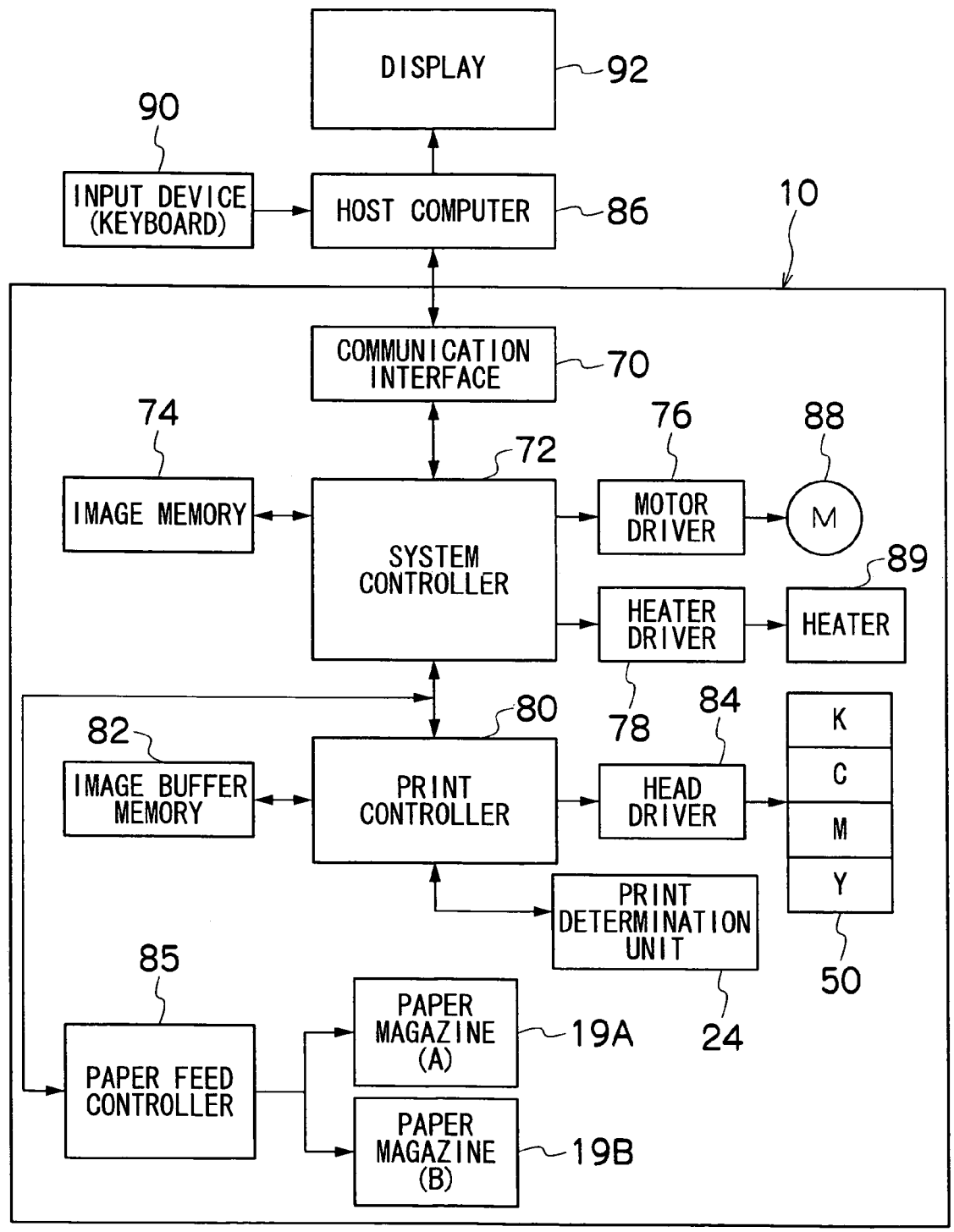
FIG. 7 is a principal block diagram showing the system composition of the ink-jet recording apparatus.

FIG. 7 is a block diagram of the principal components showing the system configuration of the inkjet recording apparatus 10. The inkjet recording apparatus 10 has a communication interface 70, a system controller 72, an image memory 74, a motor driver 76, a heater driver 78, a print controller 80, an image buffer memory 82, a head driver 84, a paper feed controller 85, and other components.

The communication interface 70 is an interface unit for receiving image data sent from a host computer 86. A serial interface such as USB, IEEE1394, Ethernet, wireless network, or a parallel interface such as a Centronics interface may be used as the communication interface 70. A buffer memory (not shown) may be mounted in this portion in order to increase the communication speed. The image data sent from the host computer 86 is received by the inkjet recording apparatus 10 through the communication interface 70, and is temporarily stored in the image memory 74. The image memory 74 is a storage device for temporarily storing images inputted through the communication interface 70, and data is written and read to and from the image memory 74 through the system controller 72. The image memory 74 is not limited to memory composed of a semiconductor element, and a hard disk drive or another magnetic medium may be used.

The system controller 72 controls the communication interface 70, image memory 74, motor driver 76, heater driver 78, paper feed controller 85, and other components. The system controller 72 has a central processing unit (CPU), peripheral circuits therefor, and the like. The system controller 72 controls communication between itself and the host computer 86, controls reading and writing from and to the image memory 74, and performs other functions, and also generates control signals for controlling a heater 89 and the motor 88 in the conveyance system.

The motor driver (drive circuit) 76 drives the motor 88 in accordance with commands from the system controller 72. The heater driver (drive circuit) 78 drives the heater 89 of the post-drying unit 42 or the like in accordance with commands from the system controller 72.

The print controller 80 has a signal processing function for performing various tasks, compensations, and other types of processing for generating print control signals from the image data stored in the image memory 74 in accordance with commands from the system controller 72 so as to apply the generated print control signals (image formation data) to the head driver 84. The print control unit 80 is a control unit having a signal processing function for performing various treatment processes, corrections, and the like, in accordance with the control implemented by the system controller 72, in order to generate a signal for controlling printing, from the image data in the image memory 74, and it supplies the print control signal (image data) thus generated to the head driver 84. Prescribed signal processing is carried out in the print control unit 80, and the discharge amount and the discharge timing of the ink droplets from the respective print heads 50 are controlled via the head driver 84, on the basis of the image data. By this means, prescribed dot size and dot positions can be achieved.

The print controller 80 is provided with the image buffer memory 82; and image data, parameters, and other data are temporarily stored in the image buffer memory 82 when image data is processed in the print controller 80. The aspect shown in FIG. 7 is one in which the image buffer memory 82 accompanies the print controller 80; however, the image memory 74 may also serve as the image buffer memory 82. Also possible is an aspect in which the print controller 80 and the system controller 72 are integrated to form a single processor.

The head driver 84 drives the actuators 58 for the print heads 12K, 12C, 12M and 12Y of the respective colors on the basis of the print data received from the print controller 80. A feedback control system for keeping the drive conditions for the print heads constant may be included in the head driver 84.

The image data to be printed is externally inputted through the communication interface 70, and is stored in the image memory 74. In this stage, the RGB image data is stored in the image memory 74. The image data stored in the image memory 74 is sent to the print controller 80 through the system controller 72, and is converted to the dot data for each ink color by a known dithering algorithm, random dithering algorithm or another technique in the print controller 80.

According to the dot data thus generated, the print head 50 is driven so that ink-droplets are ejected from the print head 50. The images are formed on the recording papers 16A and 16B by controlling the ink-droplet ejection from the print head 50 in synchronization with the conveyance velocity of the recording papers 16A and 16B.

The print determination unit 24 is a block that includes the line sensor as described above with reference to FIG. 1, reads the image printed on the recording papers 16A and 16B, determines the print conditions (presence of the ejection, variation in the dot deposition, and the like) by performing desired signal processing, or the like, and provides the determination results of the print conditions to the print controller 80. The read start timing for the line sensor is determined from the distance between the line sensor and the nozzles and the conveyance velocity of the recording papers 16A and 16B.

The print controller 80 makes various compensation with respect to the print head 50 as required on the basis of the information obtained from the print determination unit 24.

The paper feed controller 85 functions as a "timing control device", in conjunction with the system controller 72. The paper feed controller 85 controls the supply of paper from the magazines 19A and 19B in accordance with commands from the system controller 72, and it controls the timing at which the paper ends in the respective magazines 19A and 19B (in other words, the timing at which the roll is replaced).

The paper supply controller 85 includes a device for determining the remaining amount of paper, and it sends this information on the remaining amount of paper to the system controller 72. The remaining paper amount determining device includes a device for predicting (estimating) the remaining amount of paper from the amount of paper used. Possible modes which may be adopted include a mode employing a device for calculating the amount of paper used by counting the number of sheets used (a device that predicts the remaining amount by subtracting the amount used from a new roll or cassette), a mode employing a device for measuring the external diameter of the paper roll, where the remaining amount of paper is ascertained from this measurement result, a mode employing a sensor for detecting the end of the paper (end sensor), or a combination of these modes.

In the present embodiment, the timing of the end of the paper can be set by the operator (user). For example, a composition is adopted in which the timing can be set to a setting (hereinafter referred to as the "first mode") where two paper rolls come to ends at the greatest time interval apart (namely, one roll has half its paper remaining when the other roll ends), or to another setting (hereinafter referred to as the "second mode") where the two paper rolls come to ends substantially at the same time. An input device (an instruction inputting device, such as a keyboard or mouse) and a display 92 of the host computer 86 are used by the user as setting devices for making the aforementioned settings. Of course, it is also possible to adopt a mode in which a user interface for making these settings is provided in the main body of the inkjet recording apparatus 10.

In the case of the first mode (which corresponds to a first control mode), a merit is obtained in that even if one paper roll has ended, print production is continued by means of the other roll, while the roll that has ended is being replaced.

In the case of the second mode (which corresponds to a second control mode), since both rolls come to ends at the same time, a merit is obtained in that the replacement work can be carried out simultaneously.

The system controller 72 adjusts the roll replacement timings for the magazines 19A and 19B by controlling which of the two magazines 19A and 19B is used to supply paper for the printing process, in accordance with designated settings.

More specifically, if there are two or more images for which print preparations have been completed, then printing is carried out using both paper rows. If print preparations have been completed for one image, then in the case of the first mode, printing is carried out by selecting a paper row which causes the difference between the first and second rows in the remaining amounts of paper to approach ½ of a new roll, or in the case of the second mode, printing is carried out by selecting a paper row which causes the remaining amounts of paper of the respective rolls to approach each other, depending on the end timing settings made by the user.

However, if one of the paper rows is engaged in printing, then from the viewpoint of emphasizing speed, priority is given to using the free row. It may be judged whether to use the free row or the row in use, according to whether or not the time difference between the rows exceeds a particular reference time period (judgment time period), the paper supply being controlled in such a manner that the free row is used if the time difference between the rows exceeds the judgment time period.

Next, a sequence of print control in the inkjet recording apparatus 10 having the composition described above will be explained. Hereinafter, for the sake of convenience, the supply row of the recording paper 16A supplied from the magazine 19A is referred to as the "row A", and the supply row of recording paper 16B supplied from the magazine 19B is referred to as the "row B".

Figure 8A:
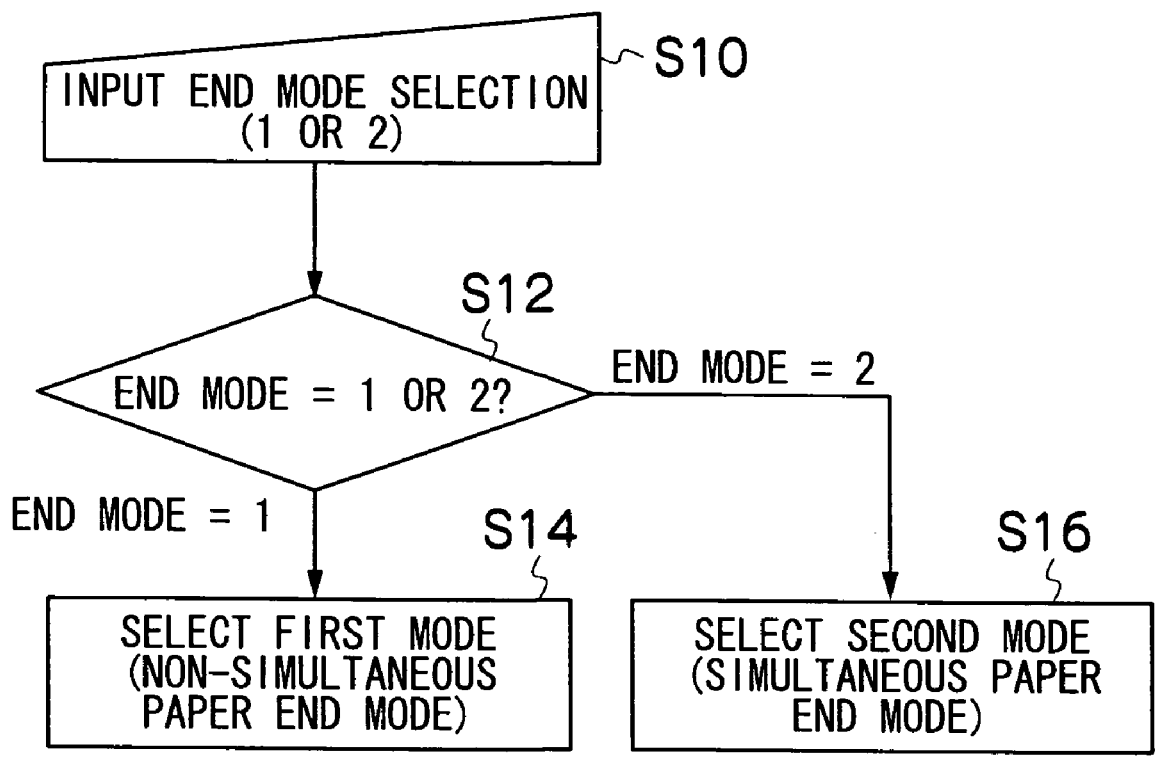
FIG. 8A is a flowchart showing an example of switching control of a paper end mode in the inkjet recording apparatus.

FIG. 8A is a flowchart showing an example of switching control of the paper end mode. Firstly, input of a selection of an end mode is accepted from the operator (user) (step S10). The user makes inputs to specify a desired end mode (first mode or second mode) by using the prescribed user interface (e.g., the input device 90 shown in FIG. 7, or the like). The specified mode information is stored in a storage device (e.g., an EEPROM) (not shown) in the system controller 72.

The system controller 72 determines the end mode specified by the user (step S12), and if it judges that the mode has been set to "End Mode=1" (in other words, the "first mode"), then it selects control according to the first mode and executes control on the basis of this first mode (non-synchronous paper end mode) which causes the paper end timings of the two paper rows to be mutually different (step S14).

On the other hand, if at the step S12 the system controller 72 judges that the mode has been set to "End Mode=2" (in other words, the "second mode"), then it selects control according to the second mode and executes control on the basis of the second mode (synchronous paper end mode) which causes the paper end timings of the two rows to become substantially the same (step S16).

FIG. 8B is a flowchart of a sequence according to the first mode, in other words, a sequence where the two paper rows come to ends at the furthest time apart (one row has half its paper remaining when the other row ends).

If an image for which print preparations have been completed is generated (step S110), firstly, the remaining amount of paper in the row A and the remaining amount of paper in the row B are compared (step S112). If the relationship "(remaining amount in the row A)>(remaining amount in the row B)" is not satisfied (NO verdict at the step S112), then the sequence advances to a step S114 and it is judged whether or not the difference between the remaining amount in the row B and the remaining amount in the row A is less than ½ of a new roll.

If the verdict is YES in the judgment at the step S114, then the sequence advances to processing for the row A priority printing (step S116). If, on the other hand, the verdict is NO in the judgment at the step S114, then the sequence advances to processing for the row B priority printing (step S118).

If the relationship "(remaining amount in the row A)> (remaining amount in the row B)" is satisfied in the judgment at the step S12, then the sequence advances to a step S120 and it is judged whether or not the difference between the remaining amount in the row A and the remaining amount in the row B is less than ½ of a new roll. If the verdict is NO in the judgment at the step S120, then the sequence advances to processing for the row A priority printing (step S122). If, on the other hand, the verdict is YES in the judgment at the step S120, then the sequence advances to processing for the row B priority printing (step S124).

Figure 9:
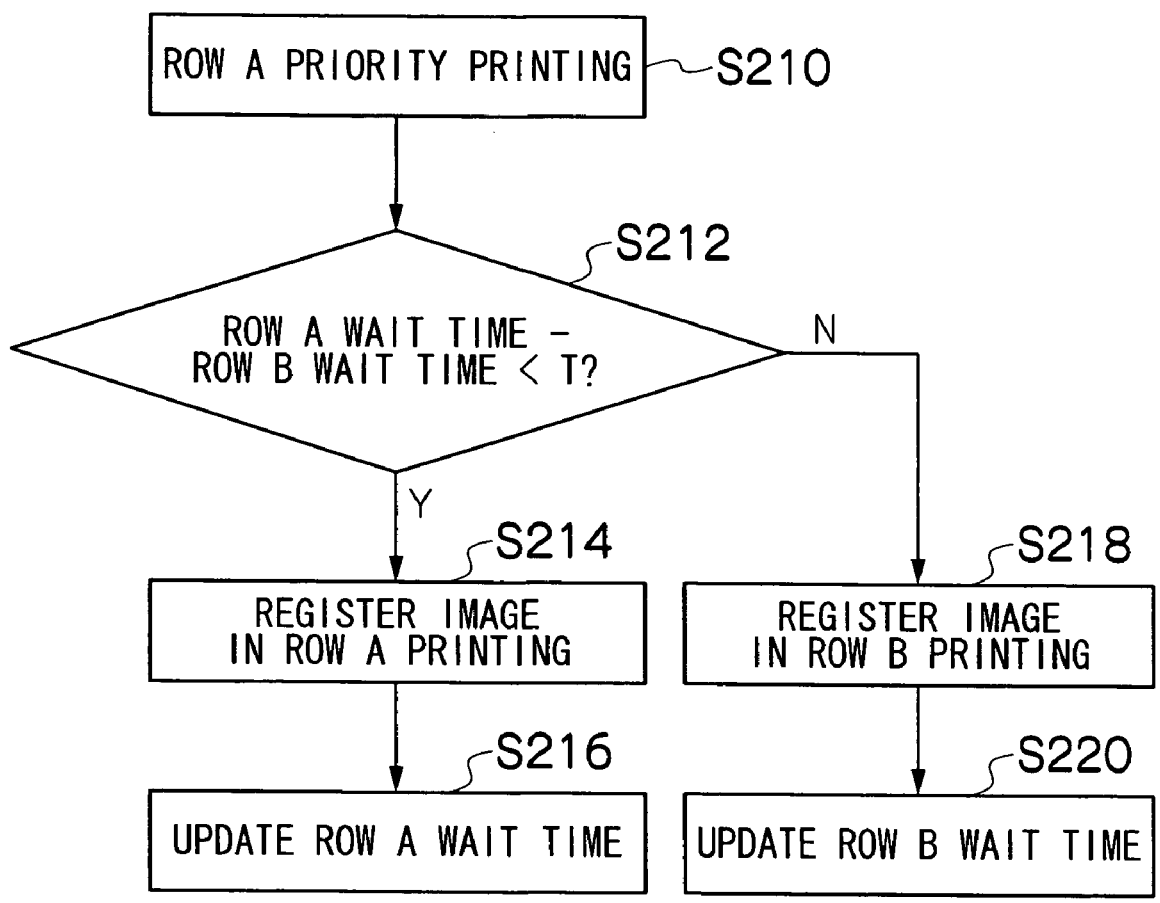
FIG. 9 is a flowchart showing an operating sequence in the inkjet recording apparatus.

FIG. 9 is a flowchart showing a sequence for the row A priority printing.

When the processing sequence for the row A priority printing starts (step S210), it is judged whether or not the difference between the printing wait time in the row A and the printing wait time in the row B is less than a prescribed judgment reference value T (step S212). If the relationship "((wait time in the row A)−(wait time in the row B))<T" is satisfied (YES verdict at the step S212), then the relevant image is registered in the print buffer for the row A (step S214), and the wait time for the row A is updated accordingly (step S216). The images registered in the buffer are printed in the order in which they are registered, on the basis of a First-In, First-Out (FIFO) method.

Moreover, in the case of a NO verdict at the step S212, in other words, in cases where the relationship "((wait time in the row A)−(wait time in the row B))<T" is not satisfied, then if the image is registered in the row A, the wait time becomes even longer and the overall print speed declines. Therefore, the relevant image is registered in the print buffer for the row B (step S218) and the wait time for the row B is updated accordingly (step S220).

Figure 10:
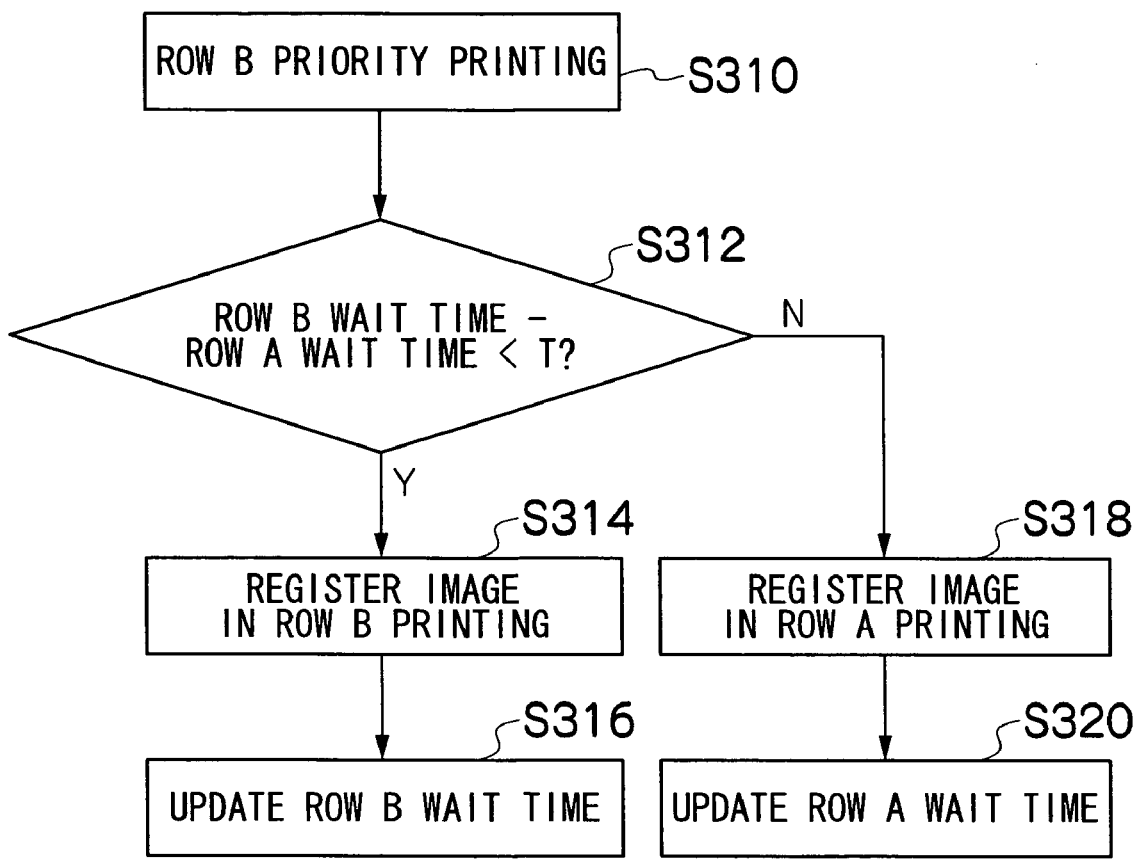
FIG. 10 is a flowchart showing an operating sequence in the inkjet recording apparatus.

FIG. 10 is a flowchart showing a sequence for the row B priority printing.

When the processing sequence for the row B priority printing starts (step S310), it is judged whether or not the difference between the printing wait time in the row B and the printing wait time in the row A is less than a prescribed judgment reference value T (step S312). If the relationship "((wait time in the row B)−(wait time in the row A))<T" is satisfied (YES verdict at the step S312), then the relevant image is registered in the print buffer for the row B (step S314), and the wait time for the row B is updated accordingly (step S316). The images registered in the buffer are printed in the order in which they are registered, on the basis of a First-In, First-Out (FIFO) method.

Moreover, in the case of a NO verdict at the step S312, in other words, in cases where the relationship "((wait time in the row B)−(wait time in the row A))<T" is not satisfied, then if the image is registered in the row B, the wait time becomes even longer and the overall print speed declines. Therefore, the relevant image is registered in the print buffer for the row A (step S318) and the wait time for the row A is updated accordingly (step S320).

In FIGS. 9 and 10 described above, the judgment reference value T is set to a time period of 0 or above. If T is set to a time period greater than 0, then the print output time is increased by T. Therefore, T is set to a suitable value in accordance with the degree of priority that is to be given to the print output time. Furthermore, the wait time should be treated as an infinitely large value in cases where the remaining amount of paper=0 (no remaining paper).

Since the paper row to be used for printing is thus determined by taking account of the number of images for which print preparations are completed and the state (the wait time) of the paper supply row in use, then the print head 12, which corresponds to the width of two rows of paper conveyed in parallel, can be utilized efficiently and hence the print speed can be increased.

When sorting the output prints (namely, when collecting together prints corresponding to each order, and stacking the prints in the correct sequence within each order), if the print stacking sequence is to be made the same as the sequence in which the images completed print preparations (which is, for example, the same as the sequence in which the images were captured), then the prints output from the two rows are finally merged together.

In this case, if the sequence in which the prints are outputted from the row A and the row B is different to the print preparation completion sequence, then it becomes necessary to change the sequence in which the prints are stacked and hence the sorting process becomes complicated. If the judgment reference value T is set to a value greater than 0 and the interval between print preparation completion times is small, then there is a possibility that situations of this kind may occur.

Figure 11:
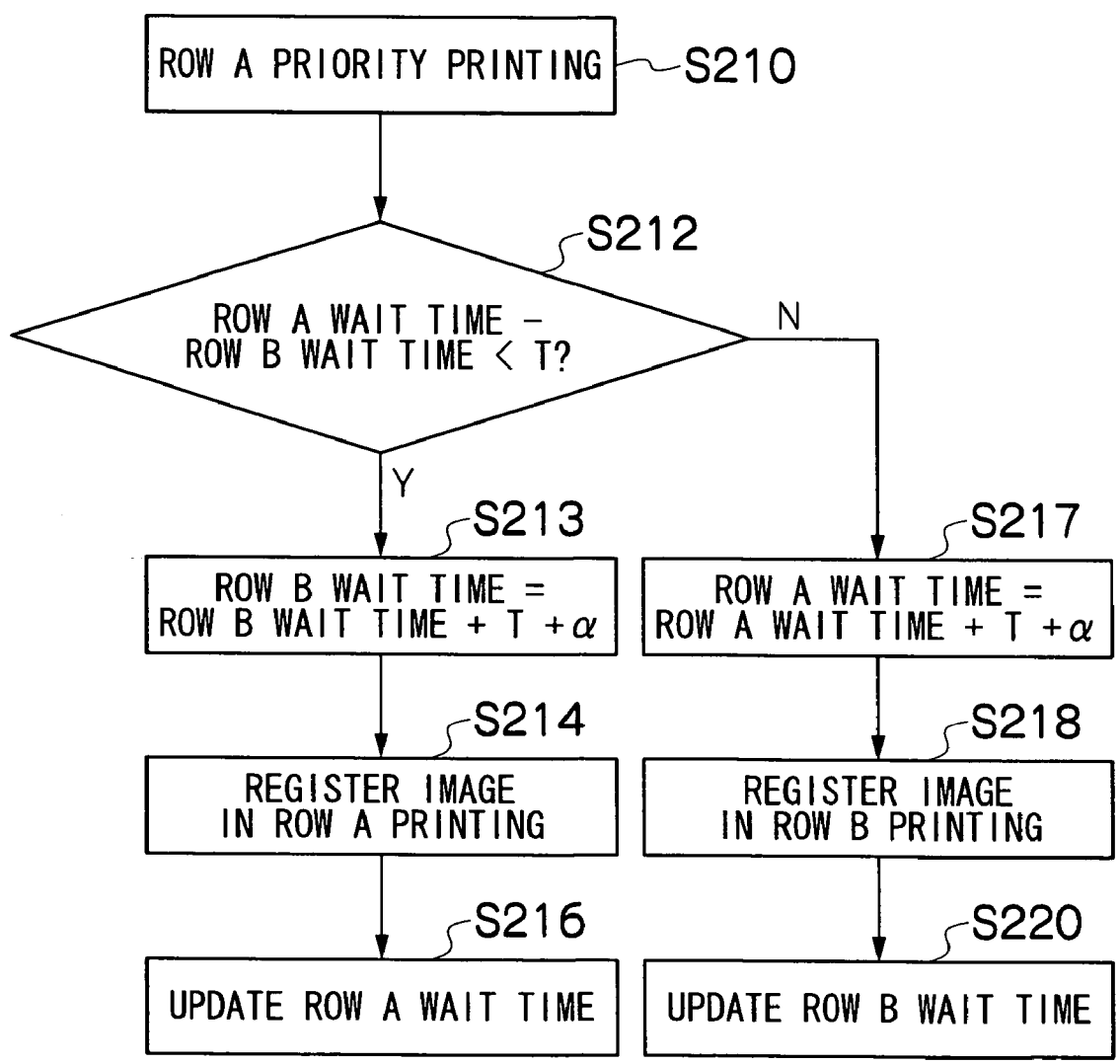
FIG. 11 is a flowchart showing an operating sequence in the inkjet recording apparatus.
Figure 12:
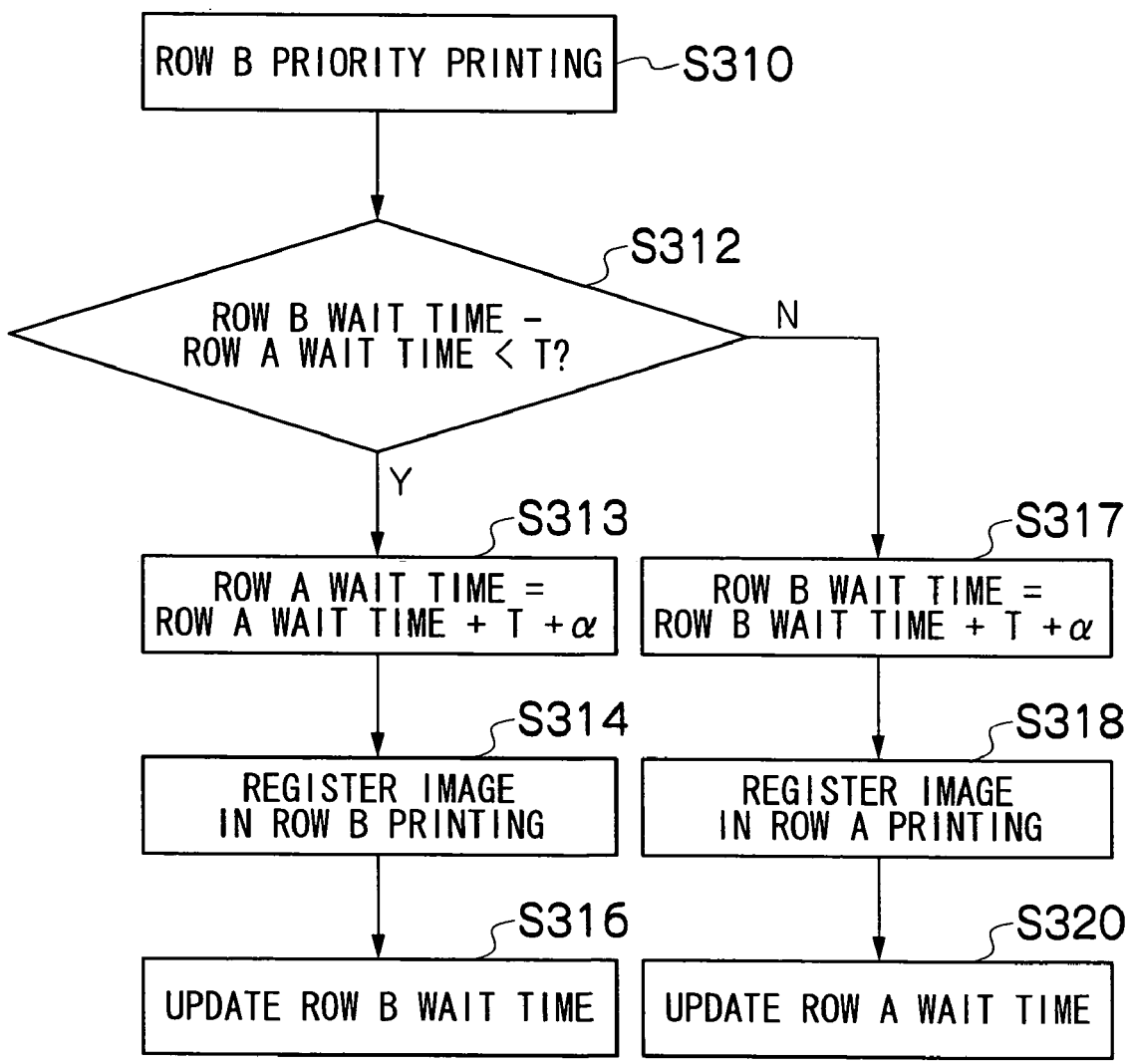
FIG. 12 is a flowchart showing an operating sequence in the inkjet recording apparatus.

In order to avoid such situations, processing flows such as those illustrated in FIGS. 11 and 12 should be adopted. The steps that are common to those in FIGS. 9 and 10 are designated with the same reference numerals and further description thereof is omitted here.

In comparison with FIG. 9, a step S213 is added in FIG. 11 after the YES verdict at the step S212, and a step S217 is added after the NO verdict at the step S212. The processing sequence advances to the step S214 after the step S213, and to the step S218 after the step S217.

Similarly, in comparison with FIG. 10, a step S313 is added in FIG. 12 after the YES verdict at the step S312, and a step S317 is added after the NO verdict at the step S312. The processing sequence advances to the step S314 after the step S313, and to the step S318 after the step S317.

In the steps S213 and S317 added in FIGS. 11 and 12, "(wait time for the row B)=(wait time for the row B)+T+$\alpha$" means that the supply of paper is delayed in such a manner that the printing start time for the row B is actually delayed by (T+$\alpha$). In other words, processing is implemented for rewriting the current wait time for the row B with a new wait time for the row B obtained by adding (T+$\alpha$) to the current value. The delay constant $\alpha$ is set to a suitable value of 0 or above.

Similarly, in the steps S217 and S313 "(wait time for row A)=(wait time for row A)+T+$\alpha$" means that the supply of paper is delayed in such a manner that the printing start time for the row A is actually delayed by (T+$\alpha$). In other words, processing is implemented for rewriting the current wait time for the row A with a new wait time for the row A obtained by adding (T+$\alpha$) to the current value.

It is thus possible to make the sequence in which the prints are outputted from the two paper conveyance rows equal to the sequence in which the images complete print preparations. This is convenient when gathering together prints for respective batches in the same sequence in which they completed print preparations.

FIG. 13 is a flowchart of a sequence relating to the second mode, in other words, a sequence in which the two rows come to ends at substantially the same time.

If an image for which print preparations have been completed is generated (step S410), firstly, the remaining amount of paper in the row A and the remaining amount of paper in the row B are compared (step S412). If the relationship "(remaining amount in the row A)>(remaining amount in the row B)" is not satisfied (NO verdict at the step S412), then the sequence advances to a step S414 and it is judged whether or not the difference between the remaining amount in the row B and the remaining amount in the row A is less than ½ of a new roll.

If the verdict is YES in the judgment at the step S414, then the sequence advances to processing for the row B priority printing (step S416). The details of the processing for the row B priority printing are similar to those described with respect to FIG. 10 or FIG. 12.

If, on the other hand, the verdict is NO in the judgment at the step S414, then the sequence advances to processing for the row A priority printing (step S418). This path means that the paper in the row B has been replaced recently, in relative terms, and in this case, rather than causing the paper to end at substantially the same time in the two rows, it is more efficient to promote replacement of the paper roll in the row A by firstly using up the paper in the row A which has little remaining paper. Therefore, the paper supply is controlled accordingly. The details of the processing for the row A priority printing are similar to those described with respect to FIG. 9 or FIG. 11.

Furthermore, if the relationship "(remaining amount in row A)>(remaining amount in row B)" is satisfied in the judgment at the step S412, then the sequence advances to a step S420 and it is judged whether or not the difference between the remaining amount in the row A and the remaining amount in the row B is less than ½ of a new roll. If the verdict is NO in the judgment at the step S420, then the sequence advances to processing for the row B priority printing (step S422). This path means that the paper in the row A has been replaced recently, in relative terms, and in this case, rather than causing the paper to end at substantially the same time in the two rows, replacement of the paper roll in the row B is promoted by firstly using up the paper in the row B, which has little remaining paper. If, on the other hand, the verdict is YES in the judgment at the step S420, then the sequence advances to processing for the row A priority printing (step S424).

By means of the sequence shown in FIG. 13, it is possible to make the two rows end at substantially the same time, and hence the task of replacing the paper can be performed at the same time for both rows.

The embodiments described above relate to an example in which the recording paper 16A outputted by the supply unit 18A and the recording paper 16B outputted by the supply unit 18B are conveyed in the two-row arrangement, in the row A and the row B, respectively. However, it is also possible to adopt a mode wherein a device is provided for switching the conveyance path of the recording paper 16A and the recording paper 16B in the conveyance path upstream of the printing unit 12 (namely, a device for directing the recording paper 16A to the row B, and the recording paper 16B to the row A). It is also possible to print by the printing unit 12 onto recording paper (for example, 16A) that is supplied from the same supply unit (for example, 18A) and is arranged in two rows.

In the foregoing embodiments, the line head type inkjet recording apparatus has been described as one example of an image forming apparatus, but the range of application of the present invention is not limited to this. The present invention may also be applied to an apparatus that is not based on a line head, provided that it has an image forming section capable of recording simultaneously onto a plurality of rows of media. The present invention may also be applied to a shuttle type inkjet recording apparatus having a scanning action which spans a plurality of rows of media. Moreover, besides inkjet apparatuses, the present invention may also be applied to a thermal transfer recording apparatus having a thermal head, an electrophotographic printer based on an LED line head or laser scanning system, or a silver halide type photographic printer.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image forming apparatus, comprising:
   an image forming section which includes an image forming device forming an image onto a recording medium;
   a plurality of recording medium supply sections which store recording media and supply the recording media to the image forming section;
   a conveyance device which conveys the recording media supplied from the plurality of recording medium supply sections; and
   an end timing control device which controls a timing at which the recording media of each of the plurality of recording medium supply sections come to an end, by controlling selection of supply source of the recording medium used for image formation by the image forming device, from among the plurality of recording medium supply sections;

a mode setting device which switches between: a first control mode in which the end timing control device controls the supply of the recording media in such a manner that when the one of the plurality of recording medium supply sections has come to the end, the at least the prescribed quantity of the recording medium remains in the at least one of the other recording medium supply sections; and a second control mode in which the end timing control device controls the supply of the recording media in such a manner that at least two of the plurality of recording medium supply sections come to the end at substantially same time, wherein the end timing control device implements control according to one of the first control mode and the second control mode depending on a setting of the mode setting device, and wherein the end timing control device controls supply of the recording media in such a manner that when one of the recording medium supply sections has come to an end, at least a prescribed quantity of the recording media remains in at least one of the other recording medium supply sections.

2. The image forming apparatus as defined in claim 1, wherein:

the conveyance device comprises a multiple-row conveyance device which conveys the recording media supplied from the plurality of recording medium supply sections, in a plurality of rows arranged in a direction orthogonal to a direction of conveyance of the recording media; and the image forming device comprises a recording head which forms images simultaneously on the plurality of recording media arranged in the plurality of rows.

3. The image forming apparatus as defined in claim 1, further comprising:

a remaining amount ascertaining device which ascertains remaining amounts of the recording media stored respectively in the plurality of recording medium supply sections, wherein the end timing control device selects the supply source of the recording medium used for the image formation according to remaining amount information for the respective recording medium supply sections obtained by the remaining amount ascertaining device.

4. An image forming apparatus, comprising:

an image forming section which includes an image forming device forming an image onto a recording medium;

a plurality of recording medium supply sections which store recording media and supply the recording media to the image forming section;

a conveyance device which conveys the recording media supplied from the plurality of recording medium supply sections; and an end timing control device which controls a timing at which the recording media of each of the plurality of recording medium supply sections come to an end, by controlling selection of supply source of the recording medium used for image formation by the image forming device, from among the plurality of recording medium supply sections, wherein the conveyance device comprises a multiple-row conveyance device which conveys the recording media supplied from the plurality of recording medium supply sections, in a plurality of rows arranged in a direction orthogonal to a direction of conveyance of the recording media;

the image forming device comprises a recording head which forms images simultaneously on the plurality of recording media arranged in the plurality of rows; and the timing control device controls formation of the images on the recording media in such a manner that a wait time for image formation in each of the plurality of rows is less than a prescribed time.

5. The image forming apparatus as defined in claim 4, wherein the end timing control device controls supply of the recording media in such a manner that at least two recording medium supply sections of the plurality of recording medium supply sections come to an end at substantially same time.

6. The image forming apparatus as defined in claim 4, wherein the end timing control device controls supply of the recording media in such a manner that when one of the recording medium supply sections has come to an end, at least a prescribed quantity of the recording media remains in at least one of the other recording medium supply sections.

7. The image forming apparatus as defined in claim 4, further comprising:

a remaining amount ascertaining device which ascertains remaining amounts of the recording media stored respectively in the plurality of recording medium supply sections, wherein the end timing control device selects the supply source of the recording medium used for the image formation according to remaining amount information for the respective recording medium supply sections obtained by the remaining amount ascertaining device.

8. An image forming apparatus, comprising:

an image forming section which includes an image forming device forming an image onto a recording medium;

a plurality of recording medium supply sections which store recording media and supply the recording media to the image forming section;

a conveyance device which conveys the recording media supplied from the plurality of recording medium supply sections; and an end timing control device which controls a timing at which the recording media of each of the plurality of recording medium supply sections come to an end, by controlling selection of supply source of the recording medium used for image formation by the image forming device, from among the plurality of recording medium supply sections, wherein the conveyance device comprises a multiple-row conveyance device which conveys the recording media supplied from the plurality of recording medium supply sections, in a plurality of rows arranged in a direction orthogonal to a direction of conveyance of the recording media;

the image forming device comprises a recording head which forms images simultaneously on the plurality of recording media arranged in the plurality of rows; and the recording head is a line type head in which a plurality of image recording elements are arranged throughout a length corresponding to a full image forming width of the plurality of recording media arranged in the plurality of rows.

9. The image forming apparatus as defined in claim 8, wherein the end timing control device controls supply of the recording media in such a manner that at least two recording medium supply sections of the plurality of recording medium supply sections come to an end at substantially same time.

10. The image forming apparatus as defined in claim 8, wherein the end timing control device controls supply of the recording media in such a manner that when one of the recording medium supply sections has come to an end, at least a prescribed quantity of the recording media remains in at least one of the other recording medium supply sections.

11. The image forming apparatus as defined in claim 8, further comprising:
a remaining amount ascertaining device which ascertains remaining amounts of the recording media stored respectively in the plurality of recording medium supply sections,
wherein the end timing control device selects the supply source of the recording medium used for the image formation according to remaining amount information for the respective recording medium supply sections obtained by the remaining amount ascertaining device.

* * * * *